United States Patent [19]
Willett et al.

[11] Patent Number: 6,025,417
[45] Date of Patent: *Feb. 15, 2000

[54] BIODEGRADABLE POLYESTER COMPOSITIONS WITH NATURAL POLYMERS AND ARTICLES THEREOF

[75] Inventors: Julious L. Willett; William M. Doane, both of Morton, Ill.; Wayne Xu, Montgomery, Ohio; Michael N. Mang, Midland, Mich.; Jerry E. White, Lake Jackson, Tex.

[73] Assignees: Biotechnology Research & Development Corp., Peoria, Ill.; The United States of America as represented by the Secretary of the Agriculture, Washington, D.C.

[*] Notice: This patent is subject to a terminal disclaimer.

[21] Appl. No.: 08/929,190

[22] Filed: Sep. 8, 1997

Related U.S. Application Data

[63] Continuation-in-part of application No. 08/804,376, Feb. 21, 1997, Pat. No. 5,852,078, and a continuation-in-part of application No. 08/761,656, Dec. 6, 1996, abandoned, which is a continuation-in-part of application No. 08/613,824, Feb. 28, 1996, abandoned, and a continuation-in-part of application No. 08/653,635, May 24, 1996, Pat. No. 5,665,786, application No. 08/653,634, May 24, 1996, Pat. No. 5,821,286, and application No. 08/673,273, Jun. 28, 1996, Pat. No. 5,861,216

[60] Provisional application No. 60/013,526, Feb. 28, 1996.

[51] Int. Cl.[7] .................................................. C08L 89/00
[52] U.S. Cl. .................. 524/17; 524/35; 524/47
[58] Field of Search .................. 524/47, 35, 17

[56] References Cited

U.S. PATENT DOCUMENTS

| | | |
|---|---|---|
| 3,149,085 | 9/1964 | Ball et al. . |
| 3,850,862 | 11/1974 | Clendinning et al. . |
| 3,901,838 | 8/1975 | Clendinning et al. . |
| 3,921,333 | 11/1975 | Clendinning et al. . |
| 3,923,729 | 12/1975 | Clendinning et al. . |
| 3,931,068 | 1/1976 | Clendinning et al. . |
| 3,932,319 | 1/1976 | Clendinning et al. . |
| 3,949,145 | 4/1976 | Otey et al. . |
| 4,016,117 | 4/1977 | Griffin . |
| 4,344,857 | 8/1982 | Shasha et al. . |
| 4,483,950 | 11/1984 | Fanta et al. . |
| 4,863,655 | 9/1989 | Lacourse et al. . |
| 4,873,270 | 10/1989 | Aime et al. . |
| 4,911,952 | 3/1990 | Doane et al. . |
| 4,983,651 | 1/1991 | Griffin . |
| 5,095,054 | 3/1992 | Lay et al. . |
| 5,171,820 | 12/1992 | Mang et al. . |
| 5,183,690 | 2/1993 | Carr et al. . |
| 5,185,382 | 2/1993 | Neumann et al. . |
| 5,186,990 | 2/1993 | Starcevich . |
| 5,219,646 | 6/1993 | Gallagher et al. . |
| 5,234,977 | 8/1993 | Bastioli et al. . |
| 5,252,271 | 10/1993 | Jeffs . |
| 5,256,711 | 10/1993 | Tokiwa et al. . |
| 5,272,181 | 12/1993 | Boehmer et al. . |
| 5,292,782 | 3/1994 | Bastioli et al. . |
| 5,321,064 | 6/1994 | Vaidya et al. . |
| 5,346,936 | 9/1994 | Buehler et al. . |
| 5,360,830 | 11/1994 | Bastioli et al. . |
| 5,384,187 | 1/1995 | Uemura et al. . |
| 5,391,423 | 2/1995 | Wnuk et al. . |
| 5,412,005 | 5/1995 | Bastioli et al. . |
| 5,422,387 | 6/1995 | Toms et al. . |
| 5,439,953 | 8/1995 | Ritter et al. . |
| 5,446,078 | 8/1995 | Vaidya eta l. . |
| 5,459,258 | 10/1995 | Merrill et al. . |
| 5,462,983 | 10/1995 | Bloembergen et al. . |
| 5,496,910 | 3/1996 | Mang et al. . |
| 5,510,401 | 4/1996 | Dehennau et al. . |
| 5,574,076 | 11/1996 | Sharak et al. . |
| 5,583,187 | 12/1996 | Sharak et al. . |
| 5,665,786 | 9/1997 | Xu et al. ............................ 521/84.1 |
| 5,821,286 | 10/1998 | Xu et al. ............................ 524/47 |

FOREIGN PATENT DOCUMENTS

| | | |
|---|---|---|
| 0513679 | 11/1992 | European Pat. Off. . |
| 0535994 | 4/1993 | European Pat. Off. . |
| 0667369 | 8/1995 | European Pat. Off. . |
| 2735483 | 6/1995 | France . |
| 4411051 | 3/1994 | Germany . |
| 90/01043 | of 1990 | WIPO . |
| 92/02363 | 2/1992 | WIPO . |
| 93/11937 | of 1993 | WIPO . |
| 93/14911 | of 1993 | WIPO . |
| 93/00399 | 1/1993 | WIPO . |
| 96/03454 | 7/1995 | WIPO . |
| 97/31979 | 4/1997 | WIPO . |
| 97/23564 | 7/1997 | WIPO . |
| 97/44388 | 11/1997 | WIPO . |
| 97/44393 | 11/1997 | WIPO . |
| 98/00459 | 8/1998 | WIPO . |

OTHER PUBLICATIONS

Koenig et al., "Biodegradable Polymer/Starch Blends, Composites, and Coatings," *PMSE*, 67, pp. 290–291 (1992).

Kotnis et al., "Processing and Mechanical Properties of Biodegradable Poly(hydroxybutyrate–co–valerate)–Starch Compositions," *J. Environ. Polymer Degradation*, 3:2, pp. 97–105 (1995).

Lim et al., "Effect of Starch Granule Size on Physical Properties of Starch–Filled Polyethylene Film," *Biotechnol. Prog.*, 8, pp. 51–57 (1992).

Mang et al., "Synthesis and Properties of Thermoplastic Hydroxy–Functional Polyesters Derived from Diacids and Diglycidyl Ethers," *Polymer Preprints*, 36:2, pp. 180–181 (1995).

(List continued on next page.)

*Primary Examiner*—Nathan M. Nutter
*Attorney, Agent, or Firm*—Majestic, Parsons, Siebert & Hsue P.C.

[57] ABSTRACT

Compositions of the invention include particular hydroxy-functional polyesters and a natural polymer. Among articles that can be made from such compositions are those with sufficiently strong tensile strengths as to form disposable utensils. However, the compositions are more environmentally friendly than commodity plastics such as polyethylene or polystyrene. Starches are particularly preferred as the natural polymers for inclusion in the compositions.

41 Claims, 6 Drawing Sheets

OTHER PUBLICATIONS

Ramsay et al., "Biodegradability and Mechanical Properties of Poly–(β–Hydroxybutyrate–Co–β–Hydroxyvalerate)–Starch Blends," *Applied and Enviromental Microbiology*, 59:4, pp. 1242–1246 (Apr. 1993).

Shogren et al., "Development of Starch Based Plastics—A Reexamination of Selected Polymer Systems in Historical Perspective," *Starch/Stärke*, 45:8, pp. 276–280 (1993).

Tatarka, Paul D., "Can Agricultural Materials Compete with Expanded Polystyrene in the Loose–Fill Market?", *The Plastics Challenge—A Revolution in Education*, Proceedings of the SPE 53rd Annual Technical Conference & Exhibits, pp. 2225–2231 (1995).

Union Carbide's "Material Safety Data Sheet" containing information on Additives, e.g. nomeclature and structure (Oct. 31, 1994).

Shogren, R.L., "Poly(ethylene oxide)—Coated Granular Starch–Poly (hydroxybutyrate–co–hydroxyvalerate) Composite Materials," *J. Environ. Polymer Degradation*, 3:2, pp. 75–80 (1995).

Tiefenbacher, Karl F., "Starch–Based Foamed Materials—Use and Degradation Properties," *J.M.S.—Pure Appl. Chem.*, A30(9 & 10), pp. 727–731 (1993).

Westhoff et al., "Starch–Polyvinyl Alcohol Films—Effect of Various Plasticizers," *Starch–Stärke*, 31, pp. 163–165 (1979).

Lawton & Fanta, "Glycerol–Plasticized Films—Prepared from Starch—Poly(vinyl alcohol) Mixtures: Effect of Poly(ethylene–co–acrylic Acid)," *Carbohydrate Polymers*, 23, pp. 275–280 (1994).

McCarthy et al., "Recent Advances in Biodegradable Polymers and Blends," Corn Utilization Conference VI, St. Louis, Missouri, Jun. 4–6, 1996.

Shogren et al., "Biodegradable Starch–Polyester Composites," Corn Utilization Conference VI, St. Louis, Missouri, Jun. 4–6, 1996.

Abstract of JP 05320326–A, Dec. 3, 1993, as found in Database WPI, Week 9402, Mar. 16, 1994, AN 94–012391/02.

Fritz et al., "Der Einsatz von Stärke bei der Modifizierung synthetischer Kunststoffe," *Starch/Stärke*, 45, No. 9, (1993) pp. 314–322.

Swanson et al., "Skin and Layer Formation in Films Prepared from Carboydrates, Poly(ethylene–co–acrylic acid), and Polyethylene," *J. of Applied Polymer Science*, 49, No. 10 (Sep. 10, 1993), pp. 1683–1693.

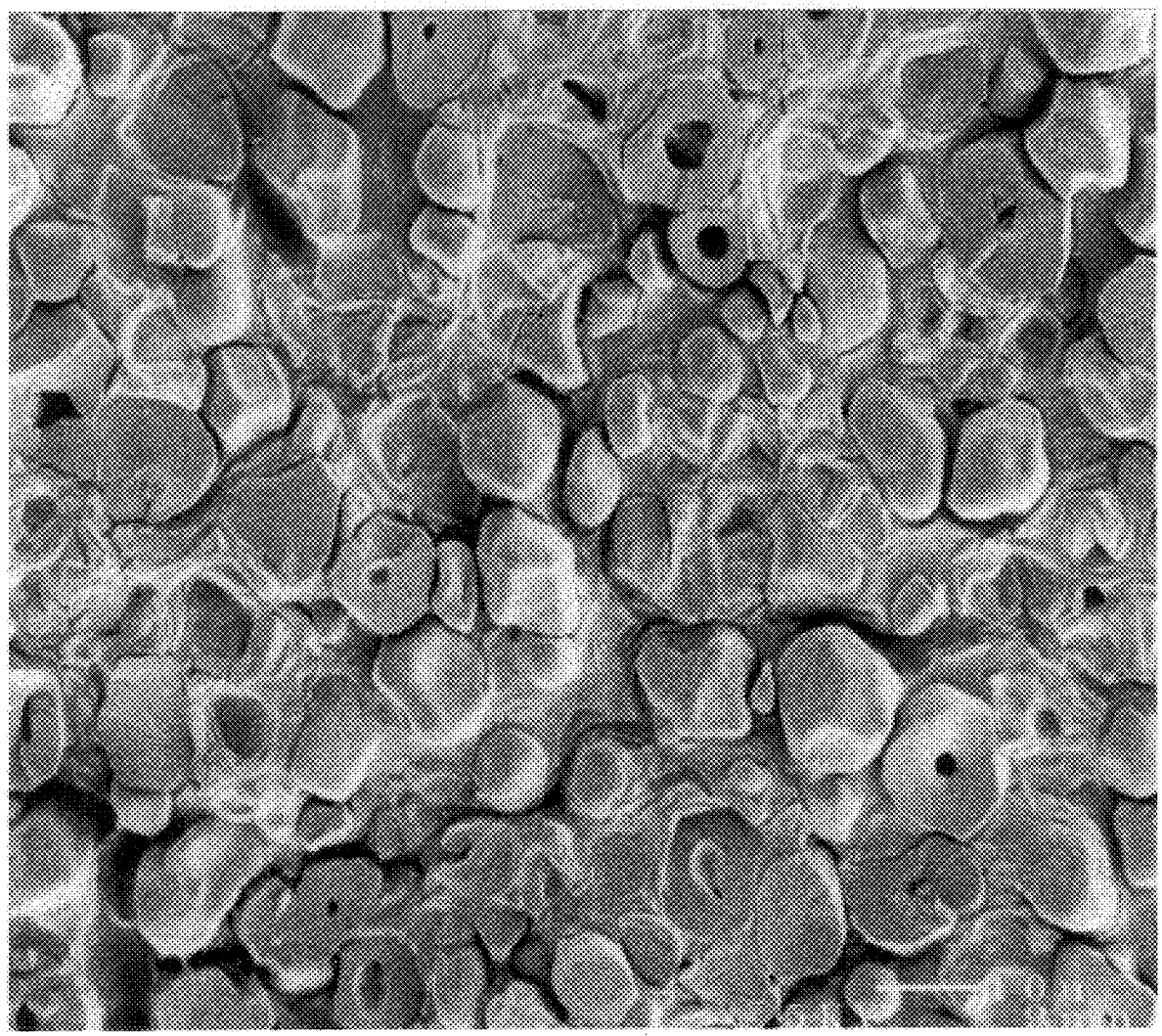
FIG._1

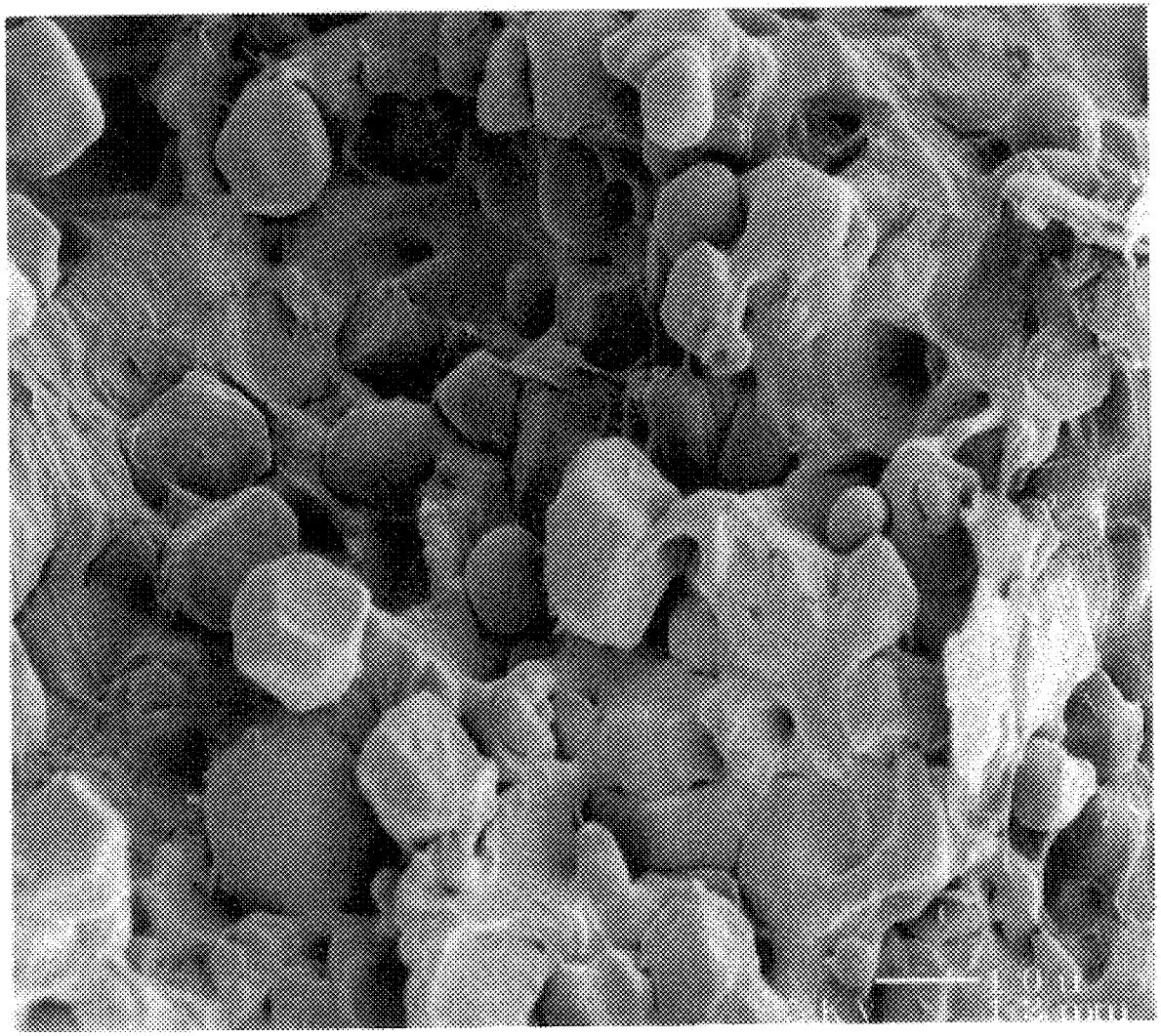
FIG._2

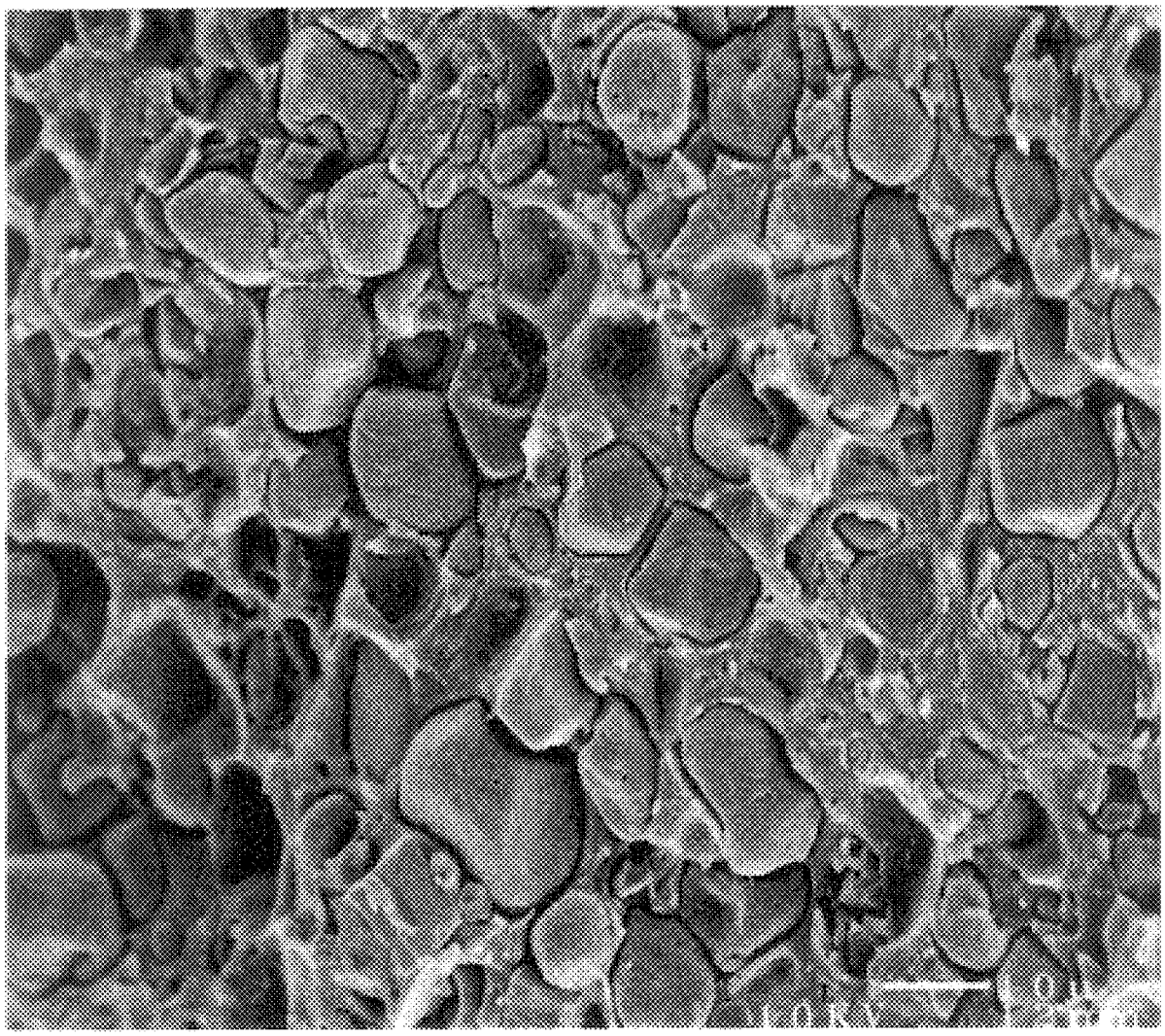
FIG._3A

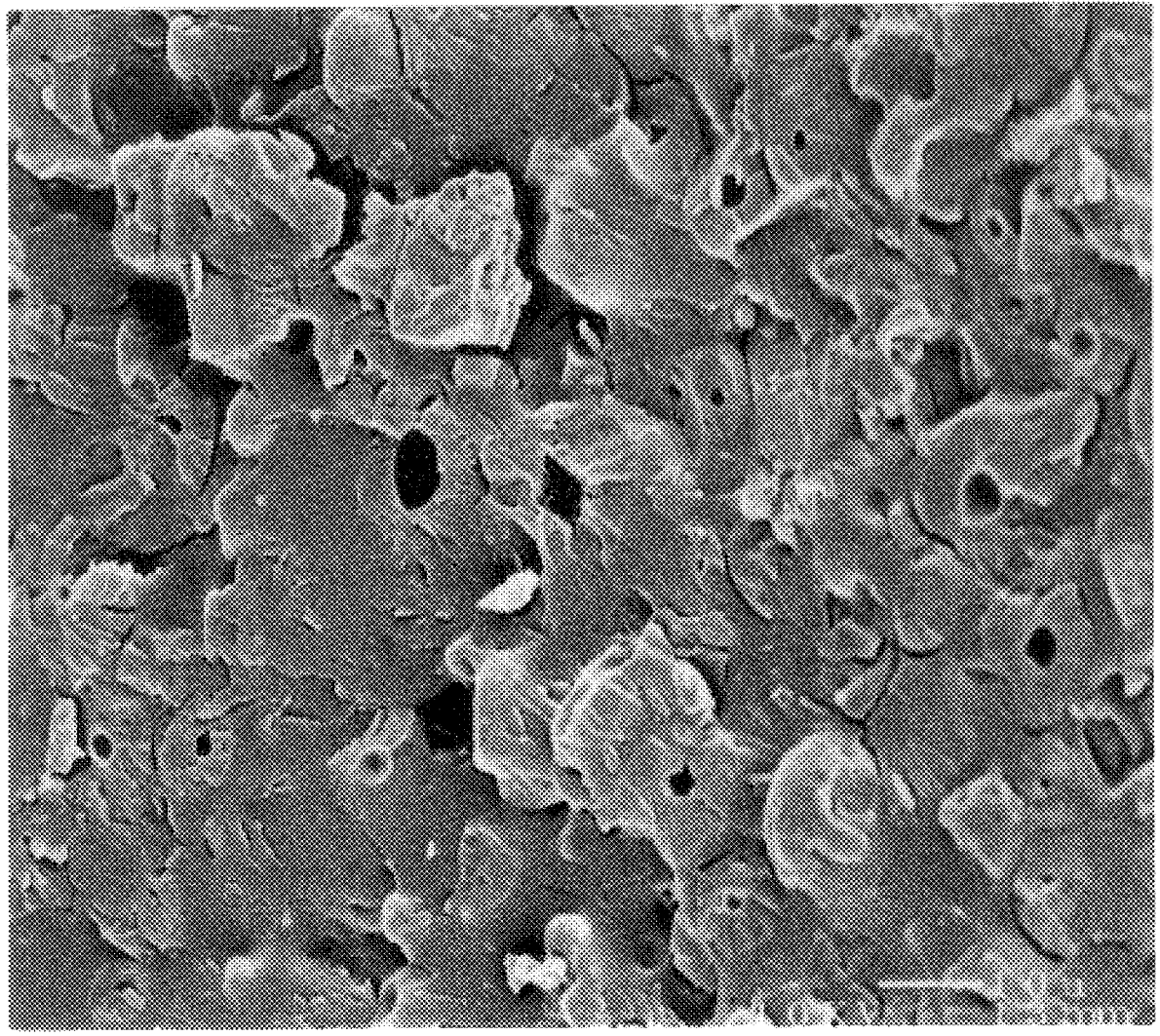
FIG._3B

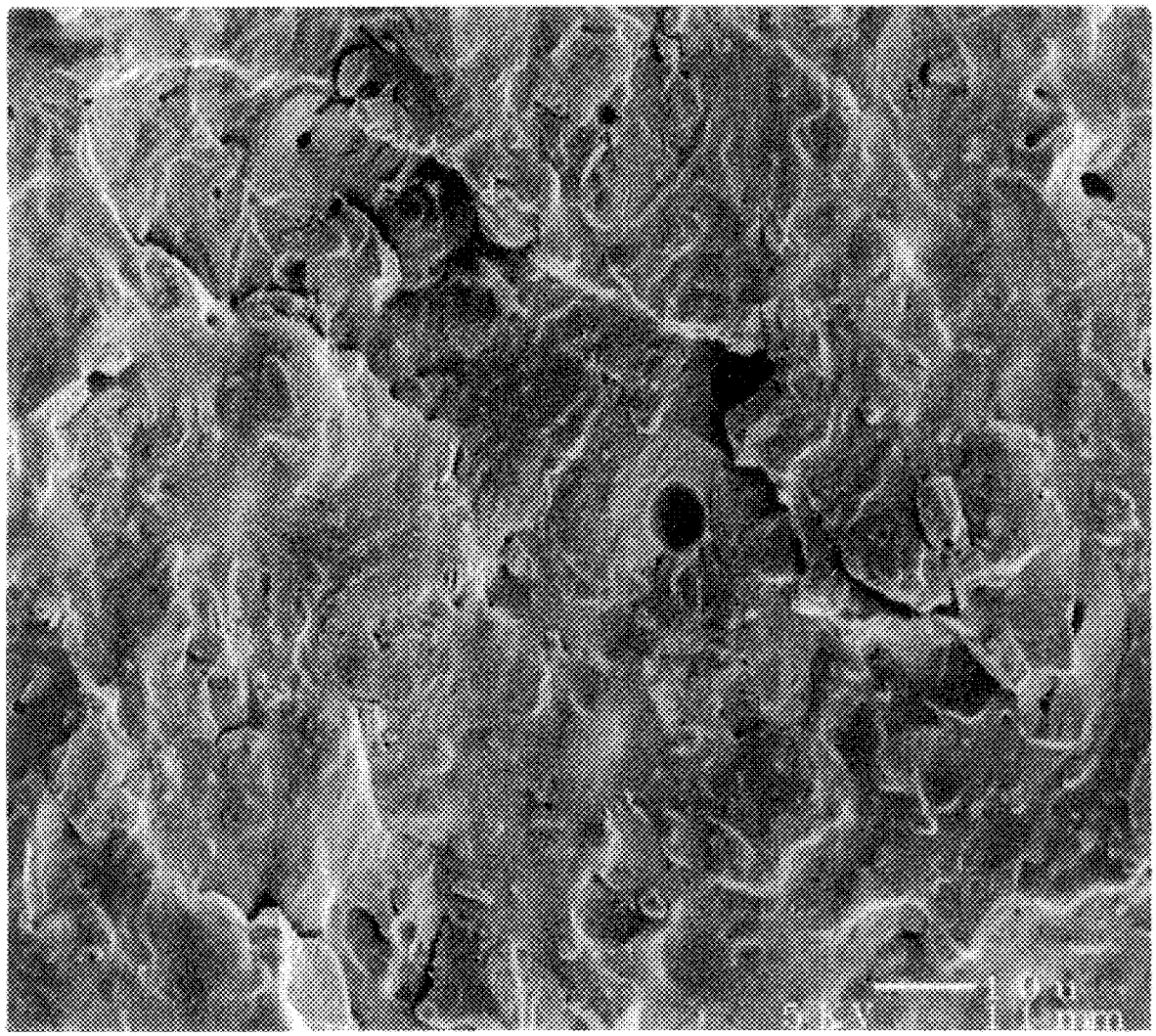
FIG._4

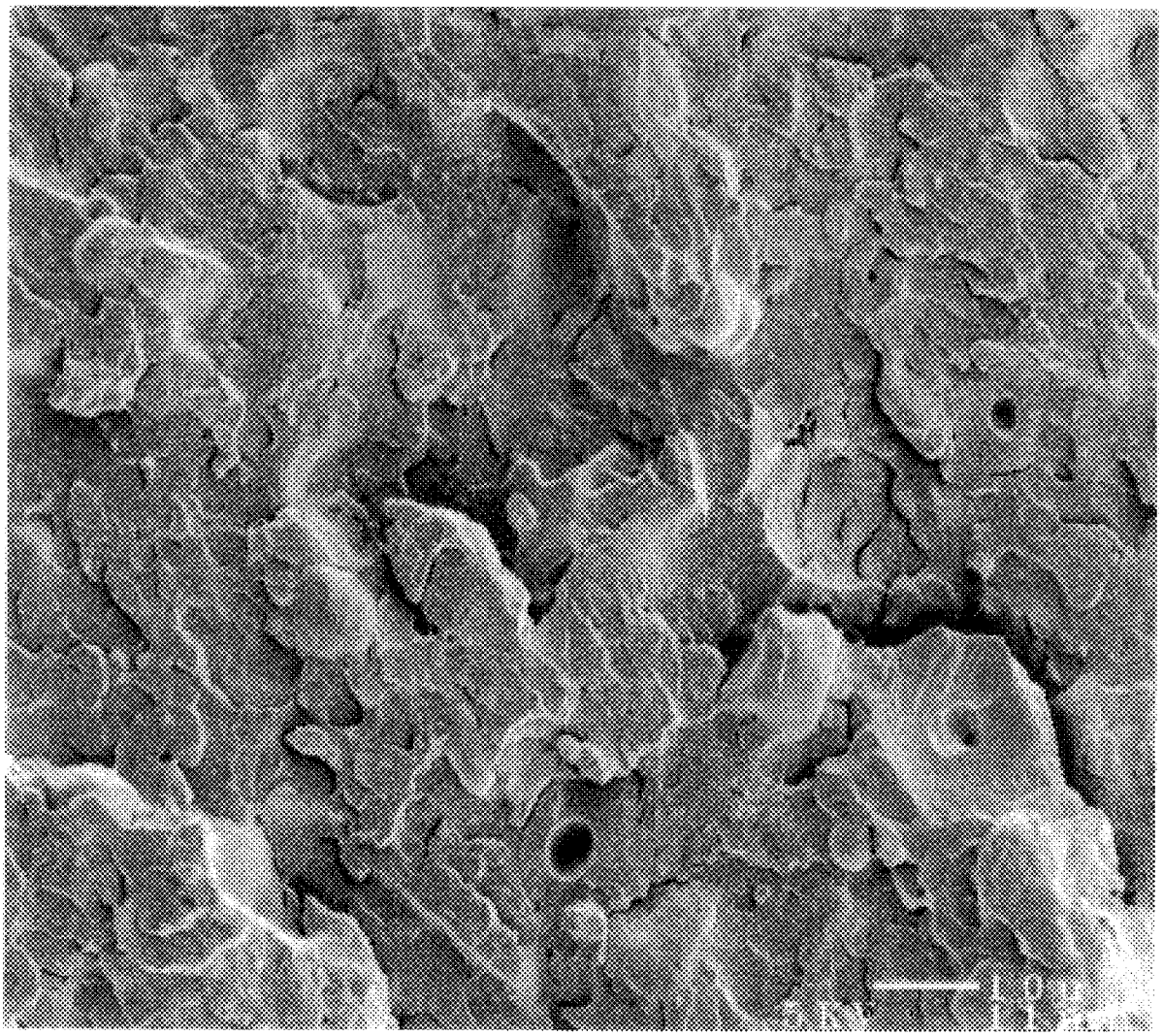
FIG._5

BIODEGRADABLE POLYESTER COMPOSITIONS WITH NATURAL POLYMERS AND ARTICLES THEREOF

CROSS-REFERENCE TO RELATED APPLICATIONS

This is a continuation-in-part of the following applications: Ser. No. 08/804,376, filed Feb. 21, 1997, now U.S. Pat. No. 5,852,078, which was based on provisional application Ser. No. 60/013,526, filed Feb. 28, 1996; Ser. No. 08/761,656, filed Dec. 6, 1996, now abandoned, which was a continuation-in-part of Ser. No. 08/613,824, filed Feb. 28, 1996, now abandoned; Ser. No. 08/653,635, filed May 24, 1996, now U.S. Pat. No. 5,665,786, issued Sep. 9, 1997; Ser. No. 08/653,634, filed May 24, 1996, now U.S. Pat. No. 5,821,286, issued Oct. 13, 1998; and, Ser. No. 08/673,273, filed Jun. 28, 1996, now U.S. Pat. No. 5,861,216.

This invention was made with government support under Grant Agreement number 59-3K95-3-126 awarded by the United States Department of Agriculture, Agricultural Research Services. The government has certain rights in this invention.

FIELD OF THE INVENTION

The present invention generally relates to compositions useful for forming articles by means such as thermoplastic processing (e.g., molding, extrusion and casting), and more particularly relates to certain synthetic hydroxy-functional polyester containing compositions hereinafter sometimes referred to as "hydroxy-functional polyester compositions." Articles with good mechanical properties, such as tensile strength and/or tensile elongation, can be made with these synthetic hydroxy-functional polymers in combination with natural polymers. Such articles are biodegradable and have a reduced cost of manufacture due to the inclusion of a low cost natural polymer, such as starch.

BACKGROUND OF THE INVENTION

Starches and modified starches have been the focus of considerable research interest in attempts to use these as fillers in order to decrease polymer costs and to use polymers that are biodegradable. As several recent examples, U.S. Pat. No. 5,384,187, issued Jan. 24, 1995, inventors Uemura et al., U.S. Pat. No. 5,391,423, issued Feb. 21, 1995, inventors Wnuk et al., and U.S. Pat. No. 5,412,005, issued May 2, 1995, inventors Bastioli et al., all represent domestic and foreign based attempts to achieve biodegradable polymer compositions in which natural polymers such as starches have been added to synthetic polymers. Unfortunately, while the inclusion of starches can reduce costs, the mechanical properties of the synthetic polymer can be so adversely affected by inclusion of starch as to vitiate the cost advantages.

Among examples of physical strength loss when starch is blended with various synthetic polymers are those described in several recent articles. Thus, for example, Koenig and Huang, *PMSE*, 67, pp. 290–291 (1992) used three different types of synthetic polymers in combination with starch and starch derivatives and reported their properties. When poly-caprolactone ("PCL") was filled with 25 wt. % starch or a starch derivative the yield strength and the tensile strength were reduced by half.

Ramsay et al., *Applied and Environmental Microbiology*, 59, pp. 1242–1246 (1993) studied poly-β-hydroxyalkanoates with starch. The biodegradable polymer [P(HB-co-HV)] was said to hold biodegradable promise, but the polymer is significantly higher in price than a commodity plastic such as polyethylene or polystyrene. The inclusion of 25 wt. % granular starch was reported to result in a composition with a tensile strength of about 60% the original (16 MPa by contrast to 27 MPa). The authors acknowledged that the use of unmodified granular starch as a particulate filler in the [P(HB-co-HV)] polymer reduced the tensile strength and did not offer any appreciable reinforcement in the mechanical rigidity, presumably due to poor adhesion of the polymer granule interface. The authors concluded it would be necessary to develop formulations with improved adhesion.

Accordingly, attempts continue to find synthetic polymer based compositions that can be formed into articles, such as for example disposable plastic utensils or stretchable thin films for food packaging purposes, that are reasonably competitive in price with commodity plastics such as polyethylene or polystyrene, but which are more environmentally friendly.

SUMMARY OF THE INVENTION

In one aspect of the present invention, compositions are provided that comprise a synthetic, hydroxy-functional polymer and a natural polymer. The synthetic polymer is a hydroxy-functional polyester that is surprisingly compatible with the natural polymer. The inventive compositions are useful for forming articles, particularly by thermoplastic processing such as molding, extrusion, and casting. Particularly preferred aspects of the invention are where the natural polymer is in the form of granules and where the natural polymer is gelatinized.

The synthetic, hydroxy-functional polymer may be as described by U.S. Pat. No. 5,171,820, inventors Mang and White, issued Dec. 15, 1992 and U.S. Pat. No. 5,496,910, inventors Mang, White and Swanson, issued Mar. 5, 1996.

Natural polymers for mixture with the synthetic, hydroxy-functional polymer include polysaccharides, modified polysaccharides, naturally-occurring fibers, and particulate fillers. Particularly preferred as the natural polymer are starches.

While the amount of hydroxy-functional polymers used depends on a variety of factors, including the specific polymer employed and the desired end uses of the composition, hydroxy-functional polymers generally can be present in an amount from about 1 to about 99 wt. % based on the total weight of the hydroxy-functional polymer and the natural polymer.

GRANULE EMBODIMENTS

Articles where the natural polymer is in granular or fiber form (sometimes hereinafter referred to as the "granule embodiment") can be formulated so as to have a tensile strength above about 20 MPa (sufficiently strong for example, so as to form disposable utensils) or to have a tensile elongation above about 200% (sufficient stretchability, for example, so as to form thin wrapping films). With one particularly preferred granule embodiment, a composition is provided with 45 wt. % starch granules (derived from corn) having an elongation of about 500%. In another particularly preferred granule embodiment, a composition is provided with 60 wt. % starch granules (derived from corn) having a tensile strength of about 22 MPa.

The remarkable compatibility of the hydroxy-functional polymers with natural polymers is illustrated by tests showing that inclusion of small amounts of granular starch into several hydroxy-functional polyesters actually increases the tensile strength of hydroxy-functional polyester. Another example of the remarkable compatibility of the particular hydroxy-functional polyesters described with granular starch is shown in instances where inclusion of plasticizer actually leads to moderately improved tensile strength, although presence of plasticizer in other polymer compositions typically softens such compositions.

In the granule embodiment, the two essential components may be admixed in varying amounts. The natural polymer may be present in a trace amount or in greater amounts up to a weight ratio with respect to the hydroxy-functional polyester of about 8:1, more preferably up to about 6:1.

GELATINIZED STARCH EMBODIMENTS

When the natural polymer is in gelatinized or thermoplastic form, inventive compositions can be used to form a variety of articles, such as foams, films and laminates. Expanded, or foam articles are subjected to an expansion process whereby an expansion agent (e.g. water) and a nucleating agent cause bubbles, or cells, to form. The expanded articles are typically water resistant. For example, some inventive expanded articles have shown no substantial disintegration when immersed in water at ambient conditions for at least about 30 minutes. Particularly preferred expanded embodiments have been extruded as a resilient, compressible, low density, substantially closed cell matrix. This compressible and resilient matrix may be the desired end result article (e.g. packaging "peanuts") or may be further processed to form desired articles, particularly by a molding thermoforming technique. These molded articles can have exterior surfaces with sufficient resistance to moisture as to be suitable for packaging materials when a liquid component is present, such as with hot, moisture emitting take-out foods.

An expanded article in accordance with the invention, was for example, formed from a composition having 10 wt % of a hydroxy-containing polyester, 89 wt % gelatinized starch and water (where about 17 wt. % of the total composition was water), and 1 wt. % nucleating agent, which was expanded in a pilot scale twin screw extruder. This resulted in expanded articles with a bulk density of about 0.64 lb/ft$^3$ (2.5×10$^{-2}$ g/cm$^3$), a resilience of about 64% and a compressibility of about 0.10 MPa. These expanded articles were tested for moisture resistance. Even after being immersed in water at room temperature and stirred with a magnetic stirring bar at 200 rpm for 30 minutes, the water remained clear, which indicated that no substantial disintegration of the articles had occurred.

Compositions of the invention are also useful in forming articles such as films with selective water resistance, good elongation, and good structural integrity properties.

The compositions of the invention can also be used for making laminates comprising at least two layers. One layer is a self-supporting structure comprising a natural polymer and another layer is self-adhered to the structure. The self-adhering layer is a hydroxy-functional polyester as described herein. Inventive laminates typically do not delaminate even when soaked in water and stretched.

Other advantages and aspects of the present invention will become apparent upon reading the specification and the appended claims.

BRIEF DESCRIPTION OF THE DRAWINGS

FIG. 1 is a scanning electron micrograph of one granule inventive embodiment at a magnification of 1000;

FIG. 2 is a scanning electron microgram of another inventive granule embodiment, again at a magnification of 1000, which was made following an elongation test;

FIGS. 3A and 3B are electron micrographs of a composition at two different stages of mixing: FIG. 3A is a micrograph of an inventive composition (designated 12H) after it has been compounded once and thus only partially mixed; and FIG. 3B is a micrograph of this inventive composition (now designated 12H') after it has been compounded twice and is an example of a thoroughly mixed composition;

FIG. 4 is an electron micrograph of an inventive composition designated 77"; and FIG. 5 is an electron micrograph of an inventive composition designated 78".

DETAILED DESCRIPTION OF THE PREFERRED EMBODIMENTS

Broadly, the present invention comprises a composition consisting essentially of two essential components: the first component is a synthetic hydroxy-functional polymer, more particularly is an hydroxy-functional polyester having a repeating structure as will hereinafter be described, and the second component is a natural polymer.

The natural polymer may be, for example, a polysaccharide, a modified polysaccharide, or a naturally occurring fiber or particulate filler, but preferably is starch or a modified starch.

While the amount of hydroxy-functional polymer selected for use depends on a variety of factors, including the specific polymer employed and the desired end uses of the composition, in general hydroxy-functional, synthetic polymers can be present in an amount of from 1 to 99 wt. %, preferably from 1 to 95 wt. %, and most preferably from 10 to 90 wt. %, based on the total weight of the hydroxy-functional polyester and the natural polymer. Particularly preferred compositions for forming films have natural polymer present as less than about 50 wt. % of the total composition; and hydroxy-functional, synthetic polymer present in amounts from at least about 10 wt. % to about 70 wt. %.

Natural polymers contemplated for use include biodegradable organic fillers, such as cellulose and other fibers and the like, which are well known. Naturally occurring fibers or particulate fillers which can be employed in the practice of the present invention for preparing the composition are, for example, wood flour, wood pulp, wood fibers, cotton, flax, hemp, or ramie fibers, rice or wheat straw, chitin, chitosan, cellulose materials derived from agricultural products, nut shell flour, corn cob flour, and mixtures thereof. Polysaccharides which can be employed in the practice of the present invention for preparing the composition are the different starches, celluloses, hemicelluloses, gums, pectins, and pullulans. Polysaccharides are known and are described, for example, in *Encyclopedia of Polymer Science and Technology*, 2nd edition, 1987.

Modified polysaccharides which can be employed in the practice of the present invention for preparing the composition are the esters and ethers of polysaccharides, such as, for example, cellulose ethers and cellulose esters, or starch esters and starch ethers. Modified polysaccharides are known and are described, for example, in *Encyclopedia of Polymer Science and Technology*, 2nd edition, 1987.

When practicing the granule embodiment of the invention, the granules of natural polymer preferably will have a particle size of less than about 100 μm, and more preferably have a particle size of up to about 50 μm and a water content of less than about 15 wt. %, more preferably less than about 10 or 11 wt. %. In the granule embodiment, the two essential components may be admixed in varying amounts. The natural polymer may be present in a trace amount or in greater amounts up to a weight ratio with respect to the hydroxy-functional polyester of about 8:1, more preferably up to about 6:1.

When practicing the invention so as to obtain expanded or some film articles, the preferred starch component is derived from a gelatinized starch or a gelatinized modified starch. By "modified" is meant that the starch can be derivatized or modified by typical processes known in the art (e.g. esterification, etherification, oxidation, acid hydrolysis, cross-linking and enzyme conversion). Thus, for example, a modified starch may be a starch ester, a starch ether, or a crosslinked starch. Conventional modifications of starch are described in publications such as *Starch: Chemistry and Technology*, 2d edition, editor Whistler et al., and *Starch Derivatives: Production and Uses*, Rutenberg et al., Academic Press, Inc., 1984.

When starch is said to be "gelatinized" it has melted and lost its crystalline state. The starch molecules have taken on a random, disordered configuration and the starch chains have become entangled. Thus, the starch is thermoplastic and is sometimes referred to as "destructured." When the gelatinized starch is admixed with the synthetic polymer under extrusion conditions so that the entire admixture is molten, the two molten polymers (natural polymer and synthetic polymer) would be expected to be homogeneously dispersed throughout the body of the extrudate in the respective proportions of each component; however, this normally does not seem to occur. Instead, the synthetic polymer has been found typically to partition so as to predominate along exterior surfaces and to remain as the predominate component along such exterior surfaces.

Suitable Hydroxy-Functional Polyesters

The preparation and structures for hydroxy-functional polyesters suitable in practicing this invention may be as described by U.S. Pat. No. 5,171,820, inventors Mang and White, issued Dec. 15, 1992, and U.S. Pat. No. 5,496,910, inventors Mang, White and Swanson, issued Mar. 5, 1996, which are hereby incorporated in their entireties by reference. Such useful hydroxy-functional polyesters for this invention may be prepared from base-catalyzed nucleophilic addition of suitable acids to epoxies, which reaction generates both an ester linkage and a pendent hydroxyl group. Transesterification and cross linking reactions are eliminated through use of quaternary ammonium halide salts as initiators for the reaction of diacids with diglycidyl ethers, providing convenient preparation of high molecular weight, thermoplastic, hydroxy-functional polyesters in ether solvents at temperatures from 80° C.–160° C. Data provided by the Dow Chemical Company (manufacturer of hydroxy-functional polyesters such as described by U.S. Pat. Nos. 5,171,820 and 5,496,910) indicates the biodegradable nature of these polymers through the ability of various soil bacteria (such as *Pseudomonas putida*) to use the synthetic polymers as a substrate for cell culture growth.

Representative structures for suitable hydroxy-functional polyesters in practicing this invention are represented by Formula A (where n provides a sufficient molecular weight, such as for example a m.w. of about 50,000–100,000. Higher molecular weights are preferred due to higher strength.

FORMULA A

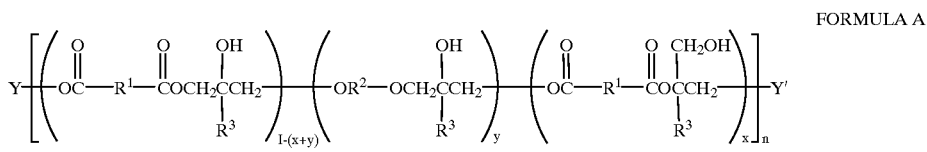

In Formula A each of $R^1$ and $R^2$ is individually a divalent organic moiety which is predominately hydrocarbon, each $R^3$ is individually hydrogen or lower alkyl, y is a fraction from 0 to 0.5 and x is a fraction from about 0.05 to about 0.4. Typically Y is hydrogen or glycidyl and Y' is glycidyl arylene ether, glycidyl alkyene ester, glycidyl alkylene ether or glycidyl arylene ester.

Thus, suitable polyesters have repeating units represented by Formula B (where each of $R^1$, $R^2$, $R^3$, x, and y are as defined above).

FORMULA B

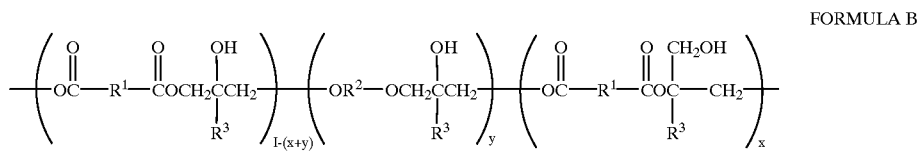

Such polyesters may be prepared from diglycidyl esters of an aliphatic diacid such as adipic due to the ready availability and reasonable price for adipic acid as a source of reactant. Other particularly preferred polyesters may be prepared from dihydric phenols, such as hydroquinone.

Four particularly preferred hydroxy-functional polyesters, used extensively to illustrate (but not to limit) the present invention, are sometimes hereinafter designated "BIS CHD," "BIS adipic," "HQ DDCA" and "BIS DDCA." These polymers will include some repeating unit structures, where the repeating units are illustrated respectively by Formulas C–F. Several of their properties of interest for the invention are summarized in Table A.

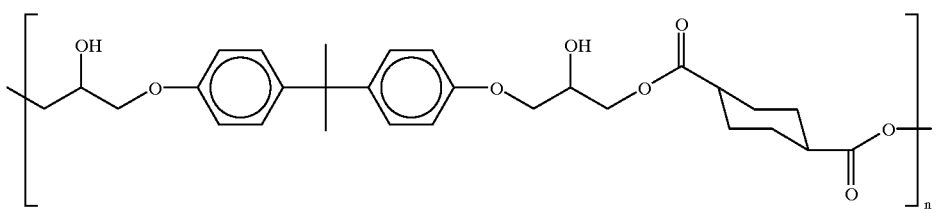

FORMULA C

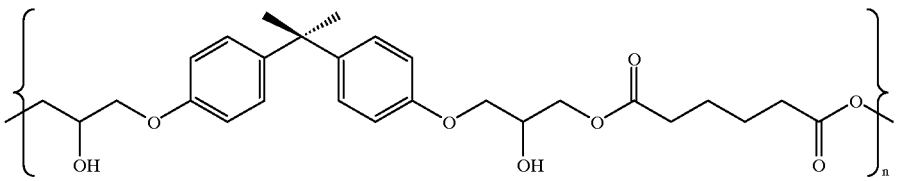

FORMULA D

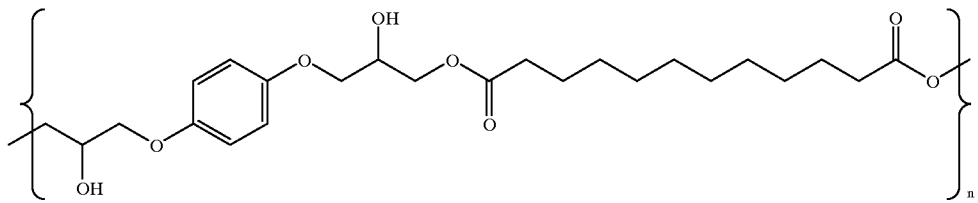

FORMULA E

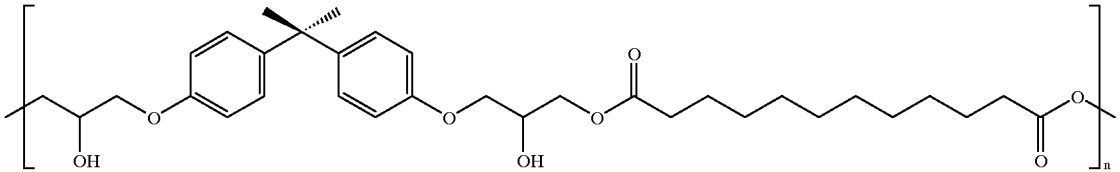

FORMULA F

In Formulas C–F, "n" preferably is as earlier described.

With reference to the data of Table A, one sees that two of the hydroxy-functional polyesters used to illustrate the granule embodiment of the invention have a quite high percentage elongation property (HQ DDCA and BIS DDCA). Thus, one would tend to choose one of these (or another with a relatively high percentage elongation property) when one wished to formulate an embodiment of the invention that had high percent elongation.

TABLE A

| Hydroxy-Functional Polyester Components | Tg (° C.) | Tensile Strength (MPa) | % Elongation |
|---|---|---|---|
| BIS CHD | 66 | 60–61 | 172 |
| BIS adipic | 45 | 12 | 157 |
| HQ DDCA | 10 | 14 | 612 |
| BIS DDCA | 20 | 1.2 | 487 |

Similarly, if one wished to formulate an inventive embodiment with outstanding tensile strength, a hydroxy-functional polyester such as BIS CHD could be chosen; however, due to the remarkable compatibility of natural polymers with the hydroxy-functional polyesters, even a polyester with a relatively modest tensile strength, such as BIS adipic, can be formulated to have substantially improved tensile strength. This will be demonstrated hereinafter by Table 3 of Example 4.

Another means of describing suitable synthetic hydroxy-functional polymers for practicing the invention is as described by Formula I in PCT application published as International Publication No. WO 97/23564, on Jul. 3, 1997, inventors Mang and White. The below illustrated repeating structure described by U.S. Pat. No. 5,496,910, inventors Mang, White and Swanson, issued Mar. 5, 1996, incorporated herein by reference and designated here as Formula I is believed to encompass Formula B.

Thus, the Formula I polymers have repeating units represented by the formula:

I wherein $R^a$ individually represents a divalent organic moiety which is predominantly hydrocarbylene (where the term "hydrocarbylene" means a divalent aliphatic hydrocarbon moiety, such as alkylene, alkenylene or cycloalkylene having from 2 to 20 carbons and optionally containing a heteroatomic group, such as oxygen, sulfur, imino, sulfonyl, carboxyl, carbonyl or sulfoxyl, in the chain or pendant thereto) or a combination of different organic moieties which are predominantly hydrocarbylene;

$R^c$ is

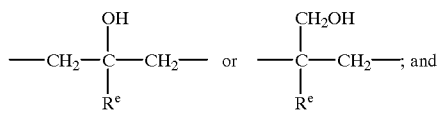

$R^d$ is

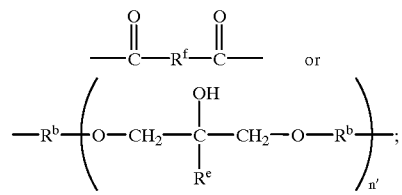

wherein $R^b$ is a divalent organic moiety which is predominantly hydrocarbylene or

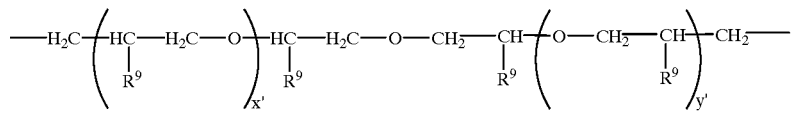

$R^e$ is hydrogen or lower alkyl, such as methyl, ethyl, butyl and propyl, more preferably hydrogen, $R^f$ is independently an organic moiety which is predominantly hydrocarbylene, $R^g$ is independently hydrogen or methyl, n' is an integer from about 0 to about 100, and x' and y' are independently integers from 0 to 100.

Representative divalent organic moieties useful as $R^a$, $R^b$, and $R^f$ include alkylene, cycloalkylene, alkylenearylene, poly(alkyleneoxyalkylene), alkylenethioalkylene, alkylenesulfonylalkylene, alkylene substituted with at least one hydroxyl group, cycloalkylene substituted with at least one hydroxyl group, alkylenearylene substituted with at least one hydroxyl group, poly(alkyleneoxyalkylene) substituted with at least one hydroxyl group, alkylenethioalkylene substituted with at least one hydroxyl group, alkylenesulfonylalkylene substituted with at least one hydroxyl group; arylene, dialkylenearylene, diaryleneketone, diarylenesulfone, diarylene oxide, and diarylene sulfide.

In the more preferred hydroxy-functional polyethers, $R^a$, $R^b$, and $R^f$ are independently methylene, ethylene, propylene, butylene, pentamethylene, hexamethylene, heptamethylene, octamethylene, nonamethylene, decamethylene, dodecamethylene, 1,4-cyclohexylene, 1,3-cyclohexylene, or 1,2-cyclohexylene optionally substituted with at least one hydroxyl group, p-phenylene, m-phenylene, or 2,6-naphthalene, diphenyleneisopropylidene, sulfonyldiphenylene, carbonyldiphenylene, oxydiphenylene, or 9,9-fluorenediphenylene and n' is from 0 to 10.

The polymers represented by Formula I may be prepared by reacting diglycidyl esters or aliphatic or aromatic diacids such as diglycidyl terephthalate, or diglycidyl ethers of dihydric phenols or alcohols with aliphatic or aromatic diacids such as adipic or terephthalic acid. Thus, suitable polymers for the present invention can be prepared by reacting a hydroxy-functional aliphatic diacid, optionally in the presence of another diacid, with a diglycidyl ether or diglycidyl ester or a mixture of diglycidyl ethers or diglycidyl esters at conditions sufficient to cause the acid moieties to react with the epoxy moieties to form a polymer backbone having ester linkages, as described in U.S. Pat. No. 5,171,820.

Preferred Starches

Among the natural polymers suitable for practicing this invention are the particularly preferred starches. Starch is a low-cost and abundant natural polymer composed of amylose and amylopectin. Amylose is essentially a linear polymer having a number average molecular weight in the range of 100,000–500,000, whereas amylopectin is a highly branched polymer having a number average molecular weight of up to several million. Unmodified, natural starches are obtained in granular form and may be derived from cereals or grains (such as corn, wheat, rice and sorghum), roots (such as cassava), legumes (such as peas), and tubers such as potato and canna. Such starch granules typically have a particle size less than about 50 $\mu$m, which is the preferred particle size when practicing the granule embodiment. While less preferred, flours whose contents are predominately starch, and which may also contain protein, oil and fiber, are operative in the invention. Where such other natural polymers are used for granular embodiment formulations, they will be processed so as to be in granular form and preferably will have a relatively uniform particle size of about 50 $\mu$m or less. Starches derived from potato and canna are less preferred for use due to their relatively large particle size of about 40 $\mu$m to about 100 $\mu$m.

Starch granules for use in the granule embodiment will normally have a water content of less than about 15 wt. %, more preferably less than about 10–11 wt. %. As will be exemplified, granules may be pre-dried to less than about 1% moisture before compounding. Although preferred, pre-drying is not believed necessary.

Derivatized (modified) starches are also suitable for use in this invention. By "derivatized starches" is meant to include starches which have been chemically treated so as to form starch esters, starch ethers, and crosslinked starches. By "modified" is meant that the starch can be derivatized or modified by typical processes known in the art (e.g. esterification, etherification, oxidation, acid hydrolysis, cross-linking and enzyme conversion). Typically, modified starches include esters, such as the acetate ester of dicarboxylic acids/anhydrides. Particularly useful are the alkenylsuccinic acids, and hydrides, ethers (such as the hydroxyethyl and hydroxypropyl starches), starches oxidized with hypochlorite, starches reacted with cross-linking agents such as phosphorus oxychloride, epichlorhydrin, hydrophobic cationic epoxides, and phosphate derivatives prepared by reaction with sodium or potassium orthophosphate or tripoly-phosphate and combinations thereof. These and other conventional modifications of starch are described in publications such as *Starch: Chemistry and Technology*, 2d edition, editor Whistler et al., and *Starch Derivatives: Production and Uses*, Rutenberg et al., Academic Press, Inc. 1984.

For example, starch esters may be prepared using a wide variety of anhydrides, organic acids, acid chlorides, or other esterification reagents. Examples of anhydrides are acetic, propionic, butyric, and so forth. Further, the degree of esterification can vary as desired, such as from one to three per glucosidic unit of the starch, or as appropriate given the number of hydroxyl groups in the monomeric unit of the natural polymer, if selected to be other than starch. Similar or different esterified natural polymers, with varying degrees of esterification, can be blended together for practicing the invention. Although esterified starches are stable to attack by amylases, in the environment the esterified starches are attached by microorganisms secreting esterases which hydrolyze the ester linkage.

Starch esters tend to be hydrophobic in contrast to starch raw materials (that is, derived by usual techniques from natural sources such as corn). Thus, depending upon the particular application, one may prefer to choose an hydrophobic starch ester rather than a hydrophilic starch in formulating compositions of the invention.

Although starches are preferred for use as the natural polymers, particularly due to ready availability and low cost, but as earlier noted other suitable natural polymers (in or prepared to be in granular form of a suitable particle size) are hydroxyl containing polymers such as cellulose, hemicellulose, chitin, guar gum, locust bean gum, pectin, xanthan, algin, agar, and dextran. Some of these can play the role of filler, also. Excellent results have been obtained with both granulated guar gum and cellulose powder, as will be exemplified hereinafter.

Optional Components

A plasticizer can be added to the inventive compositions to achieve greater material processability and product flexibility, although plasticizers typically soften the compositions in which they are included. This is not always true, however, of compositions of the invention, as will be discussed hereinafter. Molded articles and films prepared from blends including plasticizers preferably use plasticizers that are biodegradable. Examples of biodegradable plasticizers include various esters, such as phthalate esters, and various other biodegradable esters known in the chemical arts.

Inorganic fillers can be added, such as talc, calcium carbonate, diatomaceous earth, and so forth.

Precursor film-forming compositions of the invention can have part of the hydroxy-functional polymer replaced by a synthetic vinyl polymer such as poly(vinyl alcohol) or "PVA." Thus, amounts of PVA may range from 0–40 wt. % in the total inventive compositions and resulting films which, when combined with the hydroxy-functional polyester, will constitute the major component of the compositions. Inclusion of PVA will enhance film softness and film elongation, but does reduce water resistance. Therefore, the choice of whether to add PVA and the selection of the amount to be added will depend upon the balance of properties desired for the resulting films.

In addition, a suitable optional material for film-forming is a plasticizer (in addition to the gelatinizing agent, such as water). A plasticizer can be added to the compositions to achieve greater material processability and product flexibility, although plasticizers typically soften the compositions in which they are included. This is not always true, however, of compositions of the invention. When incorporated into compositions of the invention, the plasticizers preferably are biodegradable. Examples of biodegradable plasticizers include various esters, such as phthalate esters, and various other biodegradable esters known in the chemical arts. Plasticizers (other than water) are particularly preferred for inclusion into blown films, but more typically are not needed for cast films.

Other optional components known in the art, including, but not limited to, antiblocking agents, antistatic agents, slip agents, pro-heat stabilizers, antioxidants, pro-oxidant, additives may be incorporated, depending upon the application.

Antiblocking agents act to prevent film layers from sticking to one another when wound into a roll or when packaged in contact with one another. Typical antiblocking substances include concentrates of silica or talc blended with a polymeric materials such as polyethylene or polycaprolactone.

Reduction of blocking can also be obtained by loading the film surface with small particles or powders such as chalk, clay, silica, starch, and similar materials. Powdered polymeric materials (e.g. polytetrafluoroethylene) can also be used to reduce blocking when applied to the surface of films of the present invention. Such film surface treatments can be used to reduce blocking alone or in combination with other antiblock methods. The quantity of powder antiblock substance commonly added to the surface of a film, when used, is from about 0.5 $g/m^2$ to about 5 $g/m^2$.

Antistatic agents may be incorporated in films of the present invention; examples of such agents include ethoxylated amines and quaternary amine salts having organic constituents of about 12–18 carbon atoms in length. Agents of this type slowly defuse to the surface of the film and, because of their ionic character, form an electrically conductive layer on the surface of the film. Antistatic agents commonly constitute from about 1% to about 5% of the weight of the films, when used.

Slip agents may be incorporated into the films of the present invention to reduce drag over rollers and other forming equipment. Examples of such agents are those commonly derived from amides of fatty acids having about 12–22 carbon atoms. Such agents may augment the antiblocking properties of the films of the present invention. Such slip agents are commonly incorporated in films from about 0.05% to about 3% of the weight of the films when used.

EXPERIMENTAL

Aspects of the invention will now be illustrated, without intending any limitation, by the following examples. Examples 1–17 illustrate aspects of granule embodiments of the invention. Examples 18–19 illustrate aspects of expanded embodiments, while Examples 20–22 illustrate films (where Example 8 also shows that granule embodiments can be used to prepare films). Examples 23 and 24 illustrate laminate embodiments. The Examples 20–22 are taken from examples described in U.S. patent application Ser. No. 08/653,634, filed May 24, 1996, inventors Xu, Doane and Lawton, Jr. and the Examples 23 and 24 are taken from U.S. patent application Ser. No. 08/673,273, filed Jun. 28, 1996, inventors Doane, Lawton, Jr. and Shogren.

EXAMPLE 1

Inventive granule embodiments were prepared from pre-mixed batches of starch or derivatized starch and polyester and optionally containing plasticizer or other additives. The starches were pre-dried to less than 1% moisture before compounding. Compounding was then accomplished on a Brabender PL2000 torque rheometer using a mixing screw with a fluted dispersive mixing section and a notched distributive section. Strands from the die were air cooled and pelletized.

The compounded pellets were then injection molded into tensile bars (ASTM D638 Type V) either with a Cincinnati Millicron Model ACT-75B or a Rabit Hy-4 ram-type machine with a single cavity mold. For some compositions tensile bars were stamped from compression molded blanks formed in a Carver Press. Tensile bars were conditioned at 50% RH and 23° C. for one day before testing in order to provide equivalent conditions in comparing one run to another. Selected compositions were also tested after immersion in water for one day.

Tensile tests were performed on an Instron Model 4201 testing system.

As illustrated by the data in Tables 1–6, inventive granule embodiment compositions may be made as formed articles. Compositions of the invention are suitable for thermoplastic processing, such as molding, extrusion and casting, in applications where solid articles are desired as well as where thin, stretchable films are desired. In preparing the various articles from inventive compositions, the relative amounts of components will vary as one balances the properties desired with processability. For example, compositions including above about 80 wt. % starch tend to be more difficult to process.

EXAMPLE 2

Embodiments of the invention were prepared as described by Example 1. Four were selected for having a tensile strength above about 20 MPa, as is set out by the data of Table 1. The natural polymer used for all four compositions was corn-derived starch granules.

TABLE 1

| Inventive Composition | Wt. % Starch | Wt. % Polymer[a] | Other | Tensile Strength (MPa) |
|---|---|---|---|---|
| 1 | 15 | 85 | — | 66.3 |
| 2 | 30 | 70 | — | 39.0 |
| 3 | 45 | 55 | — | 22.0 |
| 4 | 60 | 40 | — | 23.3 |

[a]The hydroxy-functional polyester was BIS CHD.

The inventive composition 1 is remarkable in its tensile strength property when one considers that the tensile strength of 100% BIS CHD polymer is 60–61 MPa. This means the inventive composition with 15 wt. % starch has a tensile strength that is increased with respect to the polyester itself. This is another illustration of the remarkable compatibility between natural polymers, such as the granular starch component, and the hydroxy-functional polyester for compositions of the invention.

Returning to the data of Table 1, although inventive compositions 3 and 4 had only about ⅓ the tensile strength in comparison to a composition with all polyester, nevertheless even the highly starch filled composition had a tensile strength adequate for forming a number of useful articles, such as for example disposable utensils.

EXAMPLE 3

Further embodiments of the invention were prepared as described by Example 1. Nine were selected for having a tensile strength at about 20 MPa or greater. These are set out by the data of Table 2. The granules used as natural polymers for the Table 2 compositions were corn derived starch.

TABLE 2

| Inventive Composition | Wt. % Starch | Wt. % Polymer[a] | Other[b] Wt. % | Tensile Strength (MPa) |
|---|---|---|---|---|
| 11 | 15 | 75 | 10 | 64.5 |
| 12 | 30 | 60 | 10 | 38.9 |
| 13 | 45 | 45 | 10 | 20.6 |
| 14 | 60 | 30 | 10 | 20.2 |
| 15 | 45 | 45 | 10 | 25.2 |
| 16 | 60 | 30 | 10 | 18.0 |
| 7 | 45 | 45 | 10 | 18.3 |
| 8 | 50 | 43 | 7 | 18.8 |
| 9 | 55 | 38 | 7 | 18.6 |

[a]The hydroxy-functional polyester was BIS CHD.
[b]Compositions 11–14 included ESTAFLEX plasticizer (acetyltributylcitrate), compositions 15–16 included PARAPLEX plasticizer (epoxidized soybean oil), compositions 7–9 included either PEG 3350 or PEGC 20M plasticizer (polyethylene glycols).

The data of Table 2 illustrates the uses of various optional components, such as different plasticizers, in compositions of the invention. A comparison of inventive composition 3 from Table 1 with inventive composition 15 of Table 2 illustrates that the use of particular plasticizers can moderately improve tensile strengths. This is another example of the remarkable compatibility of the two essential components of the invention because plasticizer is normally used to improve processing, but normally softens the composition.

Inventive compositions 16 and 7–9 of Table 2 and inventive compositions 3 and 4 of Table 1 have tensile strength values in the range of about 18–23 MPa. That is, these inventive compositions have better tensile strength than the biodegradable compositions reported by Ramsey, supra, but by contrast to the Ramsey compositions the inventive compositions included between about 45–60 wt. % starch granules (whereas the Ramsey compositions included only about 25 wt. % granular starch).

EXAMPLE 4

Yet more embodiments of the invention were prepared as described by Example 1, and four were selected for having a tensile strength above about 20 MPa, the data for which are set out by Table 3.

TABLE 3

| Inventive Composition | Wt. % Starch | Wt. % Polymer[a] | Other | Tensile Strength (MPa) |
|---|---|---|---|---|
| 28 | 15 | 85 | — | 33.0 |
| 29 | 30 | 70 | — | 46.7 |
| 30 | 45 | 55 | — | 41.8 |
| 31 | 60 | 40 | — | 25.6 |

[a]The hydroxy-functional polyester was BIS adipic.

The data of Table 3 illustrates inventive compositions with yet another hydroxy-functional polyester. While inventive composition 28 (with 15 wt. % starch) has good tensile strength, it is considerably less than that found with inventive composition 1 where the hydroxy-functional ester was BIS CHD. However, with increased amounts of starch granules (in the range of 30 wt. % to 45 wt. % starch) the tensile strength improved.

FIG. 1 illustrates inventive composition 31. As illustrated, the discontinuous starch granules are well adhered in the continuous polyester phase. By contrast, non-inventive compositions of starch and with various polyesters were found readily to fall apart and when viewed with analogously magnified micrographs to have visible holes where the non-adhered starch granules had fallen out.

EXAMPLE 5

Further embodiments prepared with a particularly preferred hydroxy-functional polyester, BIS DDCA, were prepared and selected for the property of elongation. The results are reported in Table 4 below.

TABLE 4

| Inventive Composition | Wt. % Starch | Wt. % Polymer[a] | Other | Elongation (%) |
|---|---|---|---|---|
| 23 | 15 | 85 | — | 679 |
| 24 | 30 | 70 | — | 599 |
| 25 | 45 | 55 | — | 504 |

[a]The hydroxy-functional polyester was BIS DDCA.

Inventive compositions 23–25 gave outstanding elongation properties. For comparison, for example, the elongation to break (percent) for 100% high density polyethylene is 759. Thus, inventive compositions 23–25 compare quite favorably in elongation to 100% high density polyethylene, yet include up to 45 wt. % in starch granules.

EXAMPLE 6

The data of Table 5 illustrates use of yet another hydroxy-functional polyester for compositions of the invention, where the two inventive compositions have excellent elongation properties.

TABLE 5

| Inventive Composition | Wt. % Starch | Wt. % Polymer[a] | Other | Elongation (%) |
|---|---|---|---|---|
| 19 | 15 | 85 | — | 426 |
| 20 | 30 | 70 | — | 465 |

[a]The hydroxy-functional polyester was HQ DDCA.

FIG. 2 illustrates inventive composition 19. One again sees the remarkable adherency of the granules in the hydroxy-functional polyester. This FIG. 2 micrograph was made after the elongation test had been performed.

EXAMPLE 7

Unlike the preparations of Example 1, embodiments of the invention were prepared where the starch granules were not pre-dried. Instead, starch granules (containing about 10–11 wt. % water) were prepared in a manner analogous to that reported in Example 1 but with no pre-drying step. From reviewing tests performed with these embodiments, we conclude that the pre-drying step, while preferred, does not appear necessary. Alternatively, if desired to remove some moisture from the granules, such could be done during an extrusion step rather than as a separate, pre-drying step.

EXAMPLE 8

The previously described Examples 1–6 were compositions that were formed into tensile bars. We turned to using compositions in another form. Thus, thin films having less than about 0.1 mm thickness were prepared with a torque rheometer fitted with a one inch blown film die. The films obtained were conditioned at 23° C. and 50% relative humidity before testing. The data from Table 6 illustrate properties of two different inventive compositions so formed into films.

TABLE 6

| Inventive Composition | Wt. % Starch | Wt. % Polymer[a] | Other[b] | Elongation (%) |
|---|---|---|---|---|
| 45 | 28 | 66 | 6 | 244 |

Tensile Strength (MPa)

| 44 | 30 | 70 | — | 17.4 |

[a]The hydroxy-functional polyester was BIS adipic.
[b]Plasticizer was a modified polyethylene glycol.

EXAMPLE 9

Compositions were prepared with other starches or derivatized starches. Thus, diepoxide corn (a reaction product of bisphenol A diglycidyl ether (10%) and corn starch), hydroxyethyl corn, and corn flour were each formulated with BIS adipic polyesters in amounts of about 40%–50% flour or derivatized starch. However, the Table 3 compositions (using BIS adipic) have to date been found to be preferred to all the flours and derivatized starches tested.

EXAMPLE 10

Another set of tensile bar formed compositions were prepared, but instead of starch, flour or derivatized starch, the natural polymers used were either guar gum or cellulose. Both were in granule form with particle sizes well below 100 $\mu$m. The method of preparation for the compositions was the same as described in Example 1. Table 7 summarizes the results.

TABLE 7

| Inventive Composition | Tensile Strength (MPa) |
|---|---|
| 30 wt. % guar gum and 70 wt. % Bis adipic | 33 |
| 30 wt. % cellulose powder and 70 wt. % Bis adipic | 37 |

EXAMPLE 11

Starch granules derived from potatoes were also formed into blends with a hydroxy-functional polyester having properties indicated by data gathered and set out by Table 8.

TABLE 8

| | Tensile Strength (MPa) | Elongation (%) |
|---|---|---|
| Control: 100% Polyester | 21 | 705 |
| 20% Potato Starch | 12.7 | 370 |
| 40% Potato Starch | 6 | 190 |
| 60% Potato Starch | 7.45 | 14 |

The polyester used in gathering the Table 8 data may be prepared as follows.

A 13 L resin kettle, equipped with a mechanical stirrer and nitrogen inlet, is charged with hydroquinone diglycidyl ether (1312.5 g, 5.8 mol, 113.06 g/equiv. epoxide), 1,10-decanedicarboxylic acid (1343.5 g, 5.83 mol), and tetra-n-butylammonium bromide (94.2 g, 0.29 mol). Diglyme (3 L) is added and the mixture heated to 110° C. for 5.5 hours under an atmosphere of nitrogen. Glacial acetic acid (250 mL) is added and heating at 110° C. is continued overnight. The solution is allowed to cool to about 50° C. and is poured into water in a large Waring blender (300 mL portions into 2 L water). The fibrous precipitate is collected by suction filtration and suspended in fresh water for 3 days. The product is collected by suction filtration and allowed to air-dry overnight. The product is dried in a vacuum oven at 100–115° C. overnight. The polymer has an inherent viscosity of 0.42 dL/g (DMF, 25° C., 0.5 G/DL), a Tg of 5° C., and a Tm of 75° C.

Dry blends of the above polyester and unmodified potato starch are prepared using the weight ratios indicated in Table 8. The blends are compounded using a Haake mixer (60 cc bowl) at 120° C. for 6 minutes as indicated. Plaques (4"×4"×0.0625") are prepared by compression molding the material obtained from the Haake mixer. Specimens for mechanical property testing are obtained from these plaques. Selected tensile properties are listed in Table 8.

EXAMPLE 12

Multiple compoundings have been found useful in dispersing compositions with large amounts of natural polymer.

With the exception of performing the compounding step multiple times, the compositions are prepared using the steps previously outlined in Example 1. The starches were pre-dried to less than 1% moisture and then compounded with a Brabender PL2000 torque rheometer using a mixing screw with a fluted dispersive mixing section and a notched distributive section. Strands from the die were air cooled and pelletized. The compounded pellets were passed a second time through the Brabender PL2000 torque rheometer and the extruded strands were again air cooled and pelletized.

At this point, if it were desirable to perform the compounding step again, the pellets would then be passed through the Brabender PL2000. The resulting strands would then be air cooled and pelletized. This may be repeated until the compounding step no longer substantially improves the properties (such as tensile strength or tensile elongation) of the resulting compositions.

All the embodiments described in Tables 9–11 (except inventive composition 12G) have been compounded twice. Strength data for the twice compounded compositions are shown in Table 9. Starch derived from corn was used as the natural polymer and the ESTAFLEX (acetyltributyl-citrate) was used as the plasticizer.

TABLE 9

| Inventive Compositions | Wt. % Starch[a] | Polymer | Wt. % Polymer | Wt. % CaCO$_3$ | Wt. % Plasticizer[b] | Tensile Strength (MPa) |
|---|---|---|---|---|---|---|
| 12A | 50 | BIS CHD | 50 | — | — | 40 |
| 12B | 30 | BIS CHD | 50 | 20 | — | 36 |
| 12C | 50 | BIS Adipic | 50 | — | — | 32 |
| 12D | 55 | BIS Adipic | 45 | — | — | 34 |
| 12E | 65 | BIS Adipic | 35 | — | — | 38 |
| 12F | 70 | BIS Adipic | 30 | — | — | 37 |
| 12G | 75 | BIS Adipic | 25 | — | — | 19 |
| 12H | 40 | BIS Adipic | 40 | 20 | — | 41 |
| 12I | 45 | BIS Adipic | 35 | 20 | — | 44 |
| 12J | 50 | BIS Adipic | 35 | 15 | — | 50 |
| 12K | 40 | BIS Adipic | 39 | 20 | 1 | 28 |
| 12L | 40 | BIS Adipic | 39.5 | 20 | 0.5 | 34 |
| 12M | 39.2 | BIS CHD (31.4%) and BIS Adipic (7.8%) | 39.2 | 19.6 | 2 | 32 |
| 12N | 50 | BIS CHD | 45 | — | 5 | 24 |
| 12O | 60 | BIS CHD | 35 | — | 5 | 28 |

[a]The starch was derived from corn
[b]ESTAFLEX (acetyltributylcitrate) was used as the plasticizer.

FIGS. 3A and 3B dramatically illustrate the difference in electron micrographs when the composition is thoroughly processed. FIG. 3A is a scanning electron micrograph of inventive composition 12H after a single compounding step.

FIG. 3B is a scanning electron micrograph of composition 12H' which has been compounded twice. In this micrograph, discrete granules are not readily visible. Although the granules remain discrete units within the admixture, the composition is so thoroughly mixed that the granules are each substantially surrounded by the continuous polymer matrix. Without being bound by theory, it is believed that the resulting strength of the composition increases as the components are more thoroughly processed. As a result, using electron micrographs or other means known to the art for monitoring (or to have made empirical, prior determinations of preferred processing factors), compositions are preferably processed until each granule is substantially surrounded by the continuous polymer matrix.

EXAMPLE 13

Table 10 illustrates twice compounded embodiments with starch from various sources.

TABLE 9

| Inventive Compositions | Wt. % Starch | Starch Type | Wt. % BIS Adipic | Tensile Strength (MPa) |
|---|---|---|---|---|
| 13A | 60 | corn | 40 | 34 |
| 13B | 60 | rice | 40 | 37 |
| 13C | 60 | crosslinked corn | 40 | 38 |
| 13D | 60 | Amylon 7 | 40 | 22 |

EXAMPLE 14

Embodiments of the invention were essentially prepared as described by Example 12. However, in this example, the moisture content of the starch was adjusted to various levels before the first compounding. The starch was derived from corn. Results are shown in Table 11.

TABLE 11

| Inventive Composition | Wt. % Starch | % Moisture Content | Wt. % CaCO$_3$ | Wt. % BIS Adipic | Tensile Strength (MPa) |
|---|---|---|---|---|---|
| 14A | 40 | 5.2 | 20 | 40 | 35 |
| 14B | 40 | 8.7 | 20 | 40 | 37 |
| 14C | 50 | 10.7 | 10 | 40 | 16 |
| 14D | 50 | 5.6 | 10 | 40 | 34 |
| 14E | 60 | 10.7 | — | 40 | 25 |
| 14F | 60 | 5.6 | — | 40 | 23 |

EXAMPLE 15

Premixed batches of cornstarch (pre-dried to less than 1% moisture) and BIS adipic polyester and optionally calcium carbonate were compounded once as described in Example 1. Extruded strands were pelletized and the pellets were injection molded in a Cincinnati Millicron ACT 75B injection molder fitted with a three-cavity mold with cavities for a spoon, knife and fork. Flexural tests were performed on the knife on an Instron Model 4201 testing system. The results are shown in Table 12.

TABLE 12

| Inventive Composition | Wt. % Starch | Wt. % BIS Adipic | Wt. % CaCO$_3$ | Stress at Yield (MPa) | Modulus (MPa) |
|---|---|---|---|---|---|
| 71 | 50 | 50 | — | 75 | 2520 |
| 72 | 30 | 50 | 20 | 71 | 2413 |
| 73 | 35 | 45 | 20 | 66 | 3333 |
| 74 | 55 | 45 | — | 72 | 2893 |
| 75 | 60 | 40 | — | 66 | 2972 |
| 76 | 40 | 40 | 20 | 65 | 3227 |

Although compounded only once, these compositions were subjected to a second "mixing" step by being processed through an injection molder. As the strength data in Table 12 demonstrates, it is the thoroughness of mixing, and not necessarily a particular process for mixing, that improves the strength characteristics of the inventive compositions.

EXAMPLE 16

An alternative to multiple compoundings is to use a more efficient processing apparatus. In this example, starch and polyester resin and optionally calcium carbonate and plasticizer were compounded once using Werner Pfleiderer ZSK 30 mm co-rotating twin screw extruder having 14 barrel zones. Polyester resin was fed into the first barrel section and starch premixed with other optional ingredients was fed into the ninth barrel section. The last barrel section was equipped with a die head assembly which was fitted with two 3 mm rod dies. Extruded strands were chopped into pellets which were compression molded into tensile bars using a Carver press. After conditioning the bars for 24 hours at 50% relative humidity and at 23° C., they were tested on an Instron Model 4201 testing system. Results are shown in Table 13. In order to distinguish these well mixed compositions from the multiply compounded ones, the composition numbers are followed by a double prime (e.g. inventive composition 77").

TABLE 13

| Inventive Composition | Wt. % Starch | Wt. % Polyester Resin | Wt. % CaCO$_3$ | Wt. % Plasticizer (PEG 3350) | Tensile Strength (MPa) |
|---|---|---|---|---|---|
| 77" | 40 | 39.25 (BIS Adipic) | 20 | 0.75 | 39 |
| 78" | 40 | 35 (BIS CHD) | 20 | 5 | 31 |

FIGS. 4 and 5 are scanning electron micrographs of inventive compositions 77" and 78". Despite having been compounded only once, because a more efficient processing apparatus was used, the resulting compositions are still thoroughly mixed.

EXAMPLE 17

Pellets of inventive compositions 77" and 78" were processed on a Brabender PL2000 torque rheometer fitted with a 4 inch adjustable ribbon die which was adjusted to an opening of 0.015 inches. The resulting extruded ribbons of the inventive compositions were air cooled and cut into lengths of about 12 inches. Two sections of each inventive composition, each measuring about 3–4 inches by 12 inches were thermoformed into trays measuring about 5 inches by 9 inches. For a tray this size, two sections which overlapped at the center of the mold were required. The thermoforming process was at 50° C. and 75° C. for inventive compositions 77" and 78" respectively. Thermoformed trays from each inventive composition were functional and sturdy.

EXAMPLE 18

Single Screw Foaming

Precursor compositions for foamed, or expanded embodiments of the invention were prepared in two steps. The first step was wherein granules of starch, pellets of hydroxy-containing polyester, and a trace amount of talc (as nucleating agent) were admixed with water. This mixture was agitated, heated, and the starch was gelatinized ("compounding"). This compounding was performed on a Brabender PL 2000 torque rheometer using a mixing screw. The water content was 18–21 wt. % before the compounding. Temperatures during the compounding ranged from about 90° C. to about 135° C. The resultant precursor compositions in which starch was present in gelatinized form were in the initial form of strands, which were then air cooled and pelletized. The pellets were adjusted to about 17 wt. % moisture and then were processed in the second, expansion step.

This second step was a single screw expansion in which temperatures used in different barrels were in the range of 70° C. to about 210° C. (For example, inventive composition 6 was expanded at 150 rpm with a die temperature of 150° C. and barrels 1, 2, and 3 being, respectively, 70° C., 200° C., and 200° C.) Use, as here, of a single screw extruder tends to lead to higher bulk density for the extrudate. Also, the lower capacity of the apparatus require generally higher temperatures in order to avoid pressure build-up during the extrusion. Nevertheless, as shown by the data summarized in Table 14, generally acceptable properties were obtained for the so-processed inventive extrudates.

Twin Screw Foaming

The same formulation summarized in Table 14 as "18B" was again prepared as described in the first step of this example, but the strands (again pelletized and adjusted to about 17% moisture) were then processed in a Wenger TX-52 Twin Screw Extruder. This extruder is a pilot scale machine, and although not as large as the preferred commercial sized extruders, nevertheless provided a dramatically decreased bulk density (and modestly improved resiliency and compressibility) for expanded products of the same formulation, as shown by the data for inventive compositions 18A–18D. The extrusion conditions were an rpm of 285, a die temperature of 102° C., and temperatures in barrels 1, 2, and 3, respectively, of 76° C., 140° C., and 135° C.

TABLE 14

| Inventive Composition | Bulk Density (lb/ft$^3$) | Resilience (%) | Compressibility (MPa) |
|---|---|---|---|
| 18A (94 wt % cornstarch 5 wt % Bis adipic 1 wt % talc) | 1.35 | 55.2 | 0.1562 |

TABLE 14-continued

| Inventive Composition | Bulk Density (lb/ft³) | Resilience (%) | Compressibility (MPa) |
|---|---|---|---|
| 18B (89 wt % cornstarch 10 wt % BIS Adipic 1 wt % talc) | 1.70 | 57.7 | 0.1403 |
| 18C (94 wt % cornstarch 5 wt % BIS CHD 1 wt % talc) | 1.15 | 58.6 | 0.1684 |
| 18D (89 wt % cornstarch 10 wt % BIS DDCA 1 wt % talc) | 1.85 | 55.4 | 0.1531 |
| 18E (89 wt % cornstarch 10 wt % BIS adipic 1 wt % talc) | 0.64 | 63.9 | 0.1085 |

EXAMPLE 19

Foamed articles prepared from extruding precursor compositions of the invention were tested to determine wettability (or moisture resistance). These inventive articles were compared to three commercially available packaging materials (in "peanut" form).

A first comparative material was "Eco-Foam" from National Starch and Chemicals (comparative peanut 1). A second comparative product was "Clean-Green" from Clean Green (comparative peanut 2). A third comparative product was "Enpak" from DuPont (comparative peanut 3). The inventive peanut was prepared as described by Example 18E. Each of the three comparative peanuts and the inventive peanut were placed in a 200 ml flask of water at room temperature and then stirred with a magnetic stir bar at 200 rpm. The comparative peanut 1 started to disintegrate after about 1 minute. The comparative peanut 2 started to disintegrate after 2 minutes 20 seconds. The comparative peanut 3 started to disintegrate after 2 minutes. However, the inventive peanut showed no signs of disintegration after 30 minutes and the water in which it was suspended remained clear. Thus, the inventive peanut was water resistant.

An S.E.M. at a magnification of 250 of a foamed peanut of the invention reveals that the majority of cells in the matrix are closed. The cell sizes have a diameter of about 100 µm to about 150 µm.

Foamed articles, or bodies, of the invention preferably have a thin layer of the synthetic polymer predominating on the exterior surface, which conveys water resistance to the articles. In such instances, this outside layer is observable even on a macroscopic level as conveying a rather smooth surface to the exterior.

EXAMPLE 20

Films of the invention were prepared from a composition with BIS adipic polyester (70%) and starch (30%, containing 25% moisture based on starch), which was processed on a Brabender PL 2000 torque rheometer using a mixing screw (¾ inch, L/D=30). Extruded strands were pelletized and the moisture adjusted to a total of 6.5% for the pellets. The pellets were re-fed to the same torque rheometer that was now fitted with a 1 inch blown film die. The composition was processed into a blown film with a lay flat width of about 3 inches. The film was somewhat transparent and highly water resistant.

Scanning electron microscopy of an edge of the film revealed a center portion containing starch and outer surface consisting of BIS adipic polyester. Confirmation of this film structure was confirmed by Attenuated Total Reflectance Infra Red Spectroscopy. Absorbance spectra of the film surface revealed absorbance only for the BIS adipic polyester.

The percent elongation of the film averaged 105.50% and the tensile strength averaged 16.03 MPa. The films tested had an average thickness of 0.1126 mm. Water resistance was measured by water uptake by placing film specimens in water for a short time, removing the specimens, removing excess surface water by blotting, and weighing the resulting specimen. The increase in weight of the soaked films was expressed in percent of the initial weight. Since the film specimens had edges that would allow the internal portion of the film to be exposed to water, it would be expected that some water pickup would occur at the edges. As the original films were produced as bubbles, cutting films into strips does expose the center of the film at the cut edges. The water uptake as a percent for the films was, however, only 1.6%.

EXAMPLE 21

A number of film-forming compositions were prepared as outlined in Table 15. Except for composition 50, which was high amylose starch, the starch component used was normal cornstarch. The compositions also could include PVA (Airvol 325, intermediate molecular weight, fully hydrolyzed), EAA-poly(ethylene-co-acrylic acid), glycerol, and BIS adipic polyester. The compositions were prepared with enough water to equal about 30% of the total weight of the ingredients before compounding, except for composition 49, which had 20% water. To prepare the compositions for compounding, ¾ of the added water was added to PVA and mixed by hand. In a separate container, the total amount of glycerol and the remaining portion of the water was added to the starch and mixed by hand. The two separate mixtures were then combined and mixed with a kitchen mixer. The final mixture was extruded through a laboratory twin-screw extruder fitted with compounding screws. The compounded material was chopped and then processed in a Brabender PL2000 torque rheometer fitted with high shear screw and a ½ inch blown film die. Films were clear and water resistant.

Compositions 52–58 had the BIS adipic polyester added to the chopped, compounded starch-PVA immediately before the blowing step. The mixtures were then processed in a Brabender PL2000 torque rheometer fitted with a high shear screw and a ½ inch blown film die. Compositions 46–50 were initially compounded.

Films were clear and tended to be water resistant when compared to a control film prepared as for compositions 52 or 53, but without any "BIS adipic" polyester (see Example 22 below).

When films are prepared from compositions containing PVA, they are nevertheless considerably less water sensitive than starch/PVA films as known to the art that do not contain the polyester component. Accordingly, where improved structural integrity, but only modest water resistance, is needed for film applications, such as in uses for agricultural mulches, then the PVA containing films of the invention are suitable, whereas for substantially complete water resistance then films such as illustrated by Example 20 are preferred.

TABLE 15

| Composition | Starch | PVA | EAA | Glycerol | BisA | Tensile Strength | % E |
|---|---|---|---|---|---|---|---|
| 46 | 38.25 | 38.25 | 0 | 13.5 | 10 | 19.0 | 149.9 |
| 47 | 34 | 34 | 0 | 12 | 20 | 19.7 | 187.2 |
| 48 | 34 | 34 | 0 | 12 | 20 | 22.1 | 204.4 |
| 49 | 50 | 15 | 0 | 15 | 20 | 9.7 | 72.2 |
| 50 | 34 | 34 | 0 | 12 | 20 | 14.17 | 51.2 |
| 51 | 32.8 | 32.8 | 2.4 | 12 | 20 | 12.7 | 289.8 |
| 52 | 36.9 | 36.9 | 2.7 | 13.5 | 10 | 22.0 | 131.4 |
| 53 | 32.8 | 32.8 | 2.4 | 12 | 20 | 23.5 | 196.8 |
| 54 | 45.9 | 27.9 | 2.7 | 13.5 | 10 | 19.6 | 101.2 |
| 55 | 40.8 | 24.8 | 2.4 | 12 | 20 | 19.6 | 135.1 |
| 56 | 36.9 | 36.9 | 2.7 | 13.5 | 10 | 25.6 | 135.2 |
| 57 | 36.9 | 36.9 | 2.7 | 13.5 | 10 | 16.2 | 115.6 |
| 58 | 48.8 | 16.8 | 2.4 | 12 | 20 | 6.2 | 22.6 |

EXAMPLE 22

The water uptake experiment described in Example 20 was repeated for compositions 52 and 53 but without the BIS adipic polymer. Without the BIS adipic polymer, the films absorbed 18% and 34% more water, correspondingly, to compositions 52 and 53.

EXAMPLE 23

Laminates of the invention were prepared as follows. Compression molded films of various of the hydroxy-functional polymers were prepared by compressing powders of the materials between Teflon-coated metal sheets in a Carver Press. Depending upon the particular hydroxy-functional polyester, temperatures of 100° C. to 180° C. and pressures of 1000 lbs. to 9000 lbs. were used to compression mold the synthetic resins into films. These films had thicknesses of 4 mil to 10 mil. Comparison compression films, analogous to those of the inventive laminate embodiments but composed of PHBV and PLA, were similarly prepared. These compression molded films were then coated onto various substrates. For example, in Table 16 23E was an inventive laminate embodiment in which BIS adipic was on (adhered to) a starch and PVOH blend film for direct comparison with comparative articles 23G and 23H where two separate synthetic polymers (not of the invention) were similarly on the same type of starch and PVOH blended film. Coating was accomplished by placing the films on one or both sides of the selected substrates, then placing the assembly between metal plates in a Carver press and compressing at elevated temperature and pressure. The so-compressed articles were then examined for adherence of the particular polyester to the substrate. Table 16 summarizes the data of these compression molded adherence studies.

TABLE 16

| | | Ease of Removal from Substrate |
|---|---|---|
| Inventive Compression Molded Laminate Embodiments | | |
| 23A | BIS Adipic Adhered to PVOH Film | Impossible, Films Compressed into One |
| 23B | BIS Adipic Adhered to PHBV Film | Impossible, Films Compressed into One |
| 23C | BIS Adipic Adhered to Cellulose Acetate Film | Impossible, Films Compressed into One |
| 23D | BIS Adipic Adhered to PLA Film | Impossible, Films Compressed into One |
| 23E | BIS Adipic Adhered to Starch and PVOH Film | Difficult |
| 23F | BIS Adipic on Starch Tensile Bar | Difficult |
| Comparative Compression Molded Articles | | |
| 23G | PVBV on Starch and PVOH Film | Easy |
| 23H | PLA on Starch and PVOH Film | Easy |

As shown by the results summarized in Table 11, inventive compression molded laminate embodiments were so firmly adhered, or laminated, one layer to the other that the hydroxy-functional polyester layers were difficult to impossible to remove. By contrast, for the comparison compression molded articles, removal was easy. In particular, a comparison between the inventive embodiment 23E and the comparative articles 23G and 23H shows the self-adherent nature of hydroxy-functional polymers of the invention when compared with the two illustrated synthetic polyesters for comparison.

EXAMPLE 24

Extrusion blown BIS adipic and HQ-DDCA films were evaluated for their ability to form an adhesive layer between a third layer (a film of PHBV) and a starch foam tray surface. Sections of films about 6 inches by 8 inches were prepared. On one tray a section of BIS adipic film was placed on the upper surface of the tray and a film of PHBV was placed over this film. On a second tray a section of HQ-DDCA film was placed on the upper surface and a section of PHBV placed on top of this film. Each tray was then placed in the heated tray mold set at 100° C. and the mold was closed for 30 seconds. Upon removal of the trays, the third, or outer layer, of PHBV film was adhered very tightly to the hydroxy-functional polyester films, which were adhered very tightly to the foam trays. The films could not be separated from the tray without removing portions of starch from the tray. Thus, the hydroxy-functional polyester layer served to adhere both the starch foam structure and the outermost PHBV layer in a laminated form, with the hydroxy-functional polyester sandwiched between. In the absence of the BIS adipic or HQ-DDCA films, films of PHBV could not be made to adhere to the starch foam trays.

Such a triple layer, laminated structure maybe desirable for certain applications since the outermost, or exterior, layer of a polymer such as PHBV has a higher melting temperature and is even more moisture resistant than the hydroxy-functional polyester used. This example thus illustrates multiple layer structures of the invention having extremely good heat resistance and moisture resistance.

It is to be understood that while the invention has been described above in conjunction with preferred specific embodiments, the description and examples are intended to illustrate and not limit the scope of the invention, which is defined by the scope of the appended claims.

It is claimed:

1. A composition of matter comprising:

a natural polymer; and a synthetic hydroxy-functional polymer admixed with the natural polymer, the synthetic hydroxy-functional polymer having repeating units represented by Formula I:

FORMULA I $$-\left(OC-R^a-\overset{O}{\underset{\|}{C}}OR^cR^dO-R^c\right)-$$

wherein $R^a$ individually represents a divalent organic moiety which is predominantly hydrocarbylene or a combination of different organic moieties which are predominantly hydrocarbylene, $R^c$ is $$-CH_2-\underset{R^e}{\overset{OH}{\underset{|}{C}}}-CH_2- \quad \text{or} \quad -\underset{R^e}{\overset{CH_2OH}{\underset{|}{C}}}-CH_2-,$$

$R^d$ is $$-\overset{O}{\underset{\|}{C}}-R^f-\overset{O}{\underset{\|}{C}}- \quad \text{or}$$

$$-R^b-\left(O-CH_2-\underset{R^e}{\overset{OH}{\underset{|}{C}}}-CH_2-O-R^b\right)_{n'}$$

wherein $R^b$ is a divalent organic moiety which is predominantly hydrocarbylene or $$-H_2C-\left(HC-H_2C-O\right)_{x'}HC-H_2C-O-CH_2-CH-$$
with $R^g$ groups, and $-\left(O-CH_2-\underset{R^g}{CH}-CH_2-\right)_{y'}$ $R^e$ is hydrogen or lower alkyl, $R^f$ is independently an organic moiety which is predominantly hydrocarbylene, $R^g$ is independently hydrogen or methyl, n' is an integer from about 0 to about 100, and x' and y' are independently integers from 0 to 100.

2. The composition as in claim 1 wherein $R^a$, $R^b$, and $R^f$ include alkylene, cycloalkylene, alkylenearylene, poly(alkyleneoxyalkylene), alkylenethioalkylene, alkylenesulfonylalkylene, alkylene substituted with at least one hydroxyl group, cycloalkylene substituted with at least one hydroxyl group, alkylenearylene substituted with at least one hydroxyl group, poly(alkyleneoxyalkylene) substituted with at least one hydroxyl group, alkylenethioalkylene substituted with at least one hydroxyl group, alkylenesulfonylalkylene substituted with at least one hydroxyl group; arylene, dialkylenearylene, diaryleneketone, diarylenesulfone, diarylene oxide, and diarylene sulfide.

3. The composition as in claim 1 wherein $R^a$, $R^b$, and $R^f$ are independently methylene, ethylene, propylene, butylene, pentamethylene, hexamethylene, heptamethylene, octamethylene, nonamethylene, decamethylene, dodecamethylene, 1,4-cyclohexylene, 1,3-cyclohexylene, or 1,2-cyclohexylene optionally substituted with at least one hydroxyl group, p-phenylene, m-phenylene, or 2,6-naphthalene, diphenyleneisopropylidene, sulfonyldiphenylene, carbonyldiphenylene, oxydiphenylene, or 9,9-fluorenediphenylene and n' is from 0 to 10.

4. The composition as in claim 1 wherein $R^a$, $R^b$, and $R^f$ are represented by the formula:

$$-H_2C-\left(HC-H_2C-O\right)_{x'}HC-H_2C-O-CH_2-CH-$$
with $R^g$ groups, and $-\left(O-CH_2-\underset{R^g}{CH}-CH_2-\right)_{y'}$ wherein $R^g$ is independently hydrogen or methyl and X' and y' are independently from 0 to 100.

5. The composition as in claim 1 where $R^a$ and $R^f$ are independently p-phenylene, m-phenylene, or 2,6-naphthalene.

6. The composition as in claim 1 wherein $R^b$ is m-phenylene, p-phenylene, naphthylene, diphenyleneisopropylidene, sulfonyldiphenylene, carbonyldiphenylene, oxydiphenylene, or 9,9-fluorenediphenylene.

7. The composition as in claim 1 wherein $R^e$ is hydrogen.

8. The composition as in claim 1 wherein n' is from 0 to 10.

9. The composition as in claim 1 wherein the natural polymer is in the form of granules or fibers.

10. The composition as in claim 9 wherein the natural polymer is starch, a modified starch, cellulose, or guar gum.

11. The composition as in claim 10 wherein the modified starch is a starch ester, a starch ether, or a crosslinked starch.

12. The composition as in claim 9 wherein the granules have less than about 15 wt. % water.

13. The composition as in claim 9 wherein the granules have a particle size of less than about 100 μm.

14. The composition as in claim 1 wherein the natural polymer is starch or a modified starch, and the natural polymer is gelatinized.

15. The composition as in claim 14 wherein the modified starch is a starch ester, a starch ether, or a cross-linked starch.

16. The composition as in claim 1 further including one or more of a plasticizer and a filler.

17. The composition as in claim 1 wherein the natural polymer is a corn starch.

18. The composition as in claim 1 wherein $R^a$ is 1,4-cyclohexylene; where $R^e$ is hydrogen and $R^d$ is diphenyleneisopropylidene.

19. The composition as in claim 1 wherein $R^a$ is 1,4-butylene; where $R^e$ is hydrogen and $R^d$ is diphenyleneisopropylidene.

20. The composition as in claim 1 wherein $R^a$ is 1,10-decylene, where $R^e$ is hydrogen and $R^d$ is 1,4-phenylene.

21. The composition as in claim 1 wherein $R^a$ is 1,10 decylene; where $R^e$ is hydrogen and $R^d$ is diphenyleneisopropylidene.

22. An expanded article comprising:
 a compressible, resilient body, the body derived from the composition of claim 1.

23. The composition as in claim 1 wherein the natural polymer is thermoplastic.

24. The composition as in claim 1 wherein the natural polymer is a gelatinized starch that is destructurized.

25. The composition as in claim 1 wherein the natural polymer is a starch derived from potato, rice, corn or wheat.

26. A film derived from the composition of claim 1.

27. A laminate comprising at least two layers, one layer being a self-supporting structure and the other layer being self-adhered to the structure, the one layer being a natural polymer, the self-adhering layer being a synthetic hydroxy-functional polymer having repeating units represented by Formula I:

FORMULA I wherein $R^a$ individually represents a divalent organic moiety which is predominantly hydrocarbylene or a combination of different organic moieties which are predominantly hydrocarbylene, $R^c$ is

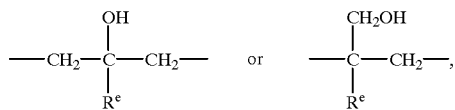

$R^d$ is

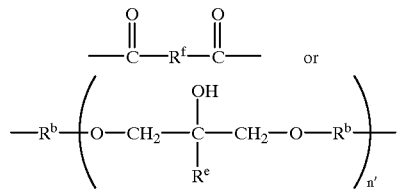

wherein $R^b$ is a divalent organic moiety which is predominantly hydrocarbylene or

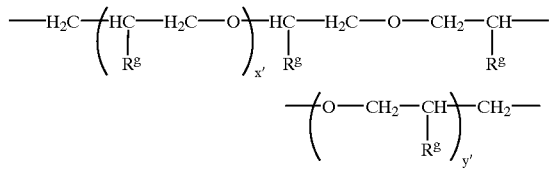

$R^e$ is hydrogen or lower alkyl, $R^f$ is independently an organic moiety which is predominantly hydrocarbylene, $R^g$ is independently hydrogen or methyl, n' is an integer from about 0 to about 100, and x' and y' are independently integers from 0 to 100.

28. The composition as in claim 1 wherein the natural polymer includes wood flour, wood pulp, wood fibers, cotton, flax, hemp, ramie fibers, rice straw, wheat straw, chitin, chitosan, cellulose materials derived from agricultural products, nut shell flour, corn cob flour, or mixtures thereof.

29. The composition as in claim 1 wherein the hydroxy-functional polymer is in an amount of from 1 to 99 weight percent of the total weight of hydroxy-functional polyester and the natural polymer.

30. The composition as in claim 1 wherein the hydroxy-functional polymer is in an amount of from 1 to 95 weight percent of the total weight of hydroxy-functional polyester and the natural polymer.

31. The composition as in claim 1 wherein the hydroxy-functional polymer is in an amount of from 10 to 90 weight percent of the total weight of hydroxy-functional polyester and the natural polymer.

32. The film as in claim 26 wherein the natural polymer is less than about 50 weight percent of the total composition and the hydroxy-functional polymer is in an amount from at least about 10 weight percent to about 70 weight percent.

33. The film as in claim 26 further comprising a plasticizer.

34. The film as in claim 26 further comprising from 0–40 weight percent of poly(vinyl)alcohol.

35. The expanded article as in claim 22 wherein the body includes a substantially closed cell matrix.

36. A formed article derived from the composition of claim 1.

37. The formed article as in claim 36 wherein the forming includes extrusion.

38. The formed article as in claim 36 wherein the forming includes thermoforming.

39. The formed article as in claim 36 wherein the forming includes injection molding.

40. The formed article as in claim 36 wherein the article has been expanded.

41. The formed article as in claim 40 wherein the article is resilient.

* * * * *